US012473751B2

(12) United States Patent
Wang et al.

(10) Patent No.: US 12,473,751 B2
(45) Date of Patent: Nov. 18, 2025

(54) LATCHING STRUCTURE, HOUSEHOLD APPLIANCE, AND CONTROL METHOD FOR HOUSEHOLD APPLIANCE

(71) Applicants: GUANGDONG MIDEA KITCHEN APPLIANCES MANUFACTURING CO., LTD., Guandong (CN); MIDEA GROUP CO., LTD., Guangdong (CN)

(72) Inventors: Yi Wang, Guangdong (CN); Yongjie Cui, Guangdong (CN); Fangtian Shen, Guangdong (CN); Gang Liu, Guangdong (CN)

(73) Assignees: GUANGDONG MIDEA KITCHEN APPLIANCES MANUFACTURING CO., LTD., Guandong (CN); MIDEA GROUP CO., LTD., Guangdong (CN)

( * ) Notice: Subject to any disclaimer, the term of this patent is extended or adjusted under 35 U.S.C. 154(b) by 864 days.

(21) Appl. No.: 17/720,824

(22) Filed: Apr. 14, 2022

(65) Prior Publication Data

US 2023/0295958 A1 Sep. 21, 2023

Related U.S. Application Data

(63) Continuation of application No. PCT/CN2022/085195, filed on Apr. 2, 2022.

(30) Foreign Application Priority Data

Mar. 21, 2022 (CN) ......................... 202210280950.9
Mar. 21, 2022 (CN) ......................... 202210283804.1
(Continued)

(51) Int. Cl.
*E05B 47/00* (2006.01)
*E05B 65/00* (2006.01)
*H05B 6/64* (2006.01)

(52) U.S. Cl.
CPC .......... *E05B 47/0006* (2013.01); *E05B 65/00* (2013.01); *H05B 6/6417* (2013.01);
(Continued)

(58) Field of Classification Search
CPC ................. E05B 47/0006; E05B 65/00; E05B 2047/0016; E05B 2047/0037;
(Continued)

(56) References Cited

U.S. PATENT DOCUMENTS 6,664,523 B1 * 12/2003 Kim ..................... H05B 6/6417 219/722
2004/0182856 A1 * 9/2004 Lee ....................... F24C 15/022 219/739
(Continued)

FOREIGN PATENT DOCUMENTS

CN 1482399 A 3/2004
CN 204163485 U 2/2015
(Continued)

OTHER PUBLICATIONS

Written Opinion dated Dec. 15, 2022 received in International Application No. PCT/CN2022/085195.
(Continued)

*Primary Examiner* — Robert G Bachner
(74) *Attorney, Agent, or Firm* — Scully, Scott, Murphy & Presser, P.C.

(57) ABSTRACT

A latching structure, a household appliance and a control method for the household appliance are provided. The latching structure has a snapping member, a bracket, a limiting member, and a driving assembly. The snapping member is mounted on a door body and has a hook. The bracket is mounted on a housing and has a limiting portion. The hook can penetrate the bracket. The door body is connected to the housing in an openable and closable
(Continued)

manner. The limiting member is rotatably mounted to the bracket and can reciprocate between an unlocked position and a locked position. The driving assembly is configured to engage with or disengage from the limiting member. In the unlocked position, the limiting member avoids the hook, and in the locked position, the limiting member is suitable for fitting the hook to limit a position of the hook.

14 Claims, 18 Drawing Sheets

(30) Foreign Application Priority Data

Mar. 21, 2022 (CN) ......................... 202220629429.7
Mar. 21, 2022 (CN) ......................... 202220631433.7

(52) U.S. Cl.
CPC ................. *E05B 2047/0016* (2013.01); *E05B 2047/0037* (2013.01); *E05B 2047/0073* (2013.01)

(58) Field of Classification Search
CPC ..... E05B 2047/0073; E05B 2047/0068; E05B 47/0004; E05B 47/0607; E05B 47/0657; E05B 65/0014; H05B 6/6417; F24C 15/022
See application file for complete search history.

(56) References Cited

U.S. PATENT DOCUMENTS

2010/0270815 A1 10/2010 Shinoda et al.
2016/0340937 A1* 11/2016 Noba ...................... E05B 77/04
2018/0187901 A1* 7/2018 Tian ...................... F24C 15/021
2020/0124291 A1* 4/2020 Reid ...................... E05C 19/024

FOREIGN PATENT DOCUMENTS

CN 204199904 U 3/2015
CN 104812980 A 7/2015
CN 206844840 U 1/2018
CN 210508736 U 5/2020
CN 212027447 U 11/2020
CN 112031555 A 12/2020
CN 212054177 U 12/2020
CN 217054727 U 7/2022
DE 102016004346 A1 10/2017
EP 1333230 A2 8/2003
EP 2369050 A2 9/2011
JP H0517058 U 3/1993

OTHER PUBLICATIONS

Lei, J. et al., "Intermittent Motion Mechanism", Basics of Mechanical Design, Nov. 2011, pp. 85-86.
Rejection Decision dated Nov. 29, 2023 received in Chinese Patent Application No. CN 202210280950.9.
Second Office Action dated Jan. 2, 2024 received in Chinese Patent Application No. CN 202210283804.1.
Written Opinion of the International Searching Authority dated Dec. 15, 2022 received in International Application No. PCT/CN2022/085195.
Rejection Decision dated Apr. 3, 2024 received in Chinese Patent Application No. CN 202210283804.1.
Reexamination Notice dated Oct. 25, 2024 received in Chinese Patent Application No. 202210280950.9.
Reexamination Decision dated Dec. 10, 2024 received in Chinese Patent Application No. 202210280950.9.
International Search Report dated Dec. 15, 2022 received in International Application No. PCT/CN2022/085195.
First Office Action dated Jun. 16, 2023 received in Chinese Patent Application No. CN 202210283804.1.
First Office Action dated Jun. 14, 2023 received in Chinese Patent Application No. CN 202210280950.9.

* cited by examiner

LATCHING STRUCTURE, HOUSEHOLD APPLIANCE, AND CONTROL METHOD FOR HOUSEHOLD APPLIANCE

CROSS-REFERENCES TO RELATED APPLICATIONS

This application is a continuation application of PCT International Application No. PCT/CN2022/085195, which claims priorities of Application No. 202210280950.9, filed on Mar. 21, 2022, titled "LATCHING STRUCTURE, HOUSEHOLD APPLIANCE, AND CONTROL METHOD FOR HOUSEHOLD APPLIANCE", Application No. 202220631433.7, filed on Mar. 21, 2022, titled "LATCHING STRUCTURE, AND HOUSEHOLD APPLIANCE", Application No. 202210283804.1, filed on Mar. 21, 2022, titled "LATCHING STRUCTURE, HOUSEHOLD APPLIANCE, AND CONTROL METHOD FOR HOUSEHOLD APPLIANCE", and Application No. 202220629429.7, filed on Mar. 21, 2022, titled "LATCHING STRUCTURE AND HOUSEHOLD APPLIANCE", the entire contents of which are incorporated herein by reference for all purposes. No new matter has been introduced.

FIELD

The present disclosure relates to the technical field of household appliances, and in particular, a latching structure, a household appliance, and a control method for the household appliance.

BACKGROUND

A door of a household appliance (such as a cooking appliance) can be opened by means of a button or by sliding or touching. The furnace door can be easily opened without applying external force or only with a small external force. The overall operation is simple and convenient and only requires one step, and thus children can also open the furnace door very easily. The door of the cooking appliance can be opened so easy and has no child lock function. During the use of the cooking appliance, there is a potential safety hazard that children may open the furnace door by themselves and get scalded by high-temperature items. In addition, since the household appliances usually work in a high temperature environment, the potential safety hazards may happen if the door is accidentally opened.

SUMMARY

The present disclosure provides a latching structure, a household appliance, and a control method for the household appliance, at least for solving the problem that the door of the cooking appliance can be opened so easy and has no child lock function.

Some embodiments of the present disclosure provide a latching structure. The latching structure includes a snapping member, a bracket, a limiting member, and a driving assembly. The snapping member is mounted on a door body and includes a hook. The bracket mounted on a housing. The bracket includes a limiting portion configured to engage with the hook, the hook is capable of penetrating the bracket, and the door body is connected to the housing in an openable and closable manner. The limiting member is rotatably mounted to the bracket and capable of reciprocating between an unlocked position and a locked position. The driving assembly is configured to engage with or disengage from the limiting member. The limiting member is driven to be switched to the unlocked position when the driving assembly is engaged with the limiting member. The limiting member is switched to the locked position under its own gravity when the driving assembly is disengaged from the limiting member. In the unlocked position, the limiting member is configured to avoid the hook in such a manner that the hook is capable of moving to separate from or engage with the limiting portion, and in the locked position, the limiting member is configured to fit with the hook to limit a position of the hook.

In some embodiments, when the hook is separated from the limiting portion and the limiting member is in the locked position under its own gravity, the hook is capable of pushing the limiting member to rotate to the unlocked position.

In some embodiments, the limiting member includes a main body, an engagement portion, and a limiting portion. The main body is rotatably mounted on the bracket. The engagement portion is mounted on a side surface of the main body and configured to engage with the driving assembly. The limiting portion is mounted on a side surface of the main body and configured to limit the hook to the limiting portion. The hook is capable of pushing the limiting portion to move to the unlocked position. A weight of the limiting portion is greater than a weight of the engagement portion. When the driving assembly is disengaged from the engagement portion, the limiting portion is capable of moving from the unlocked position to the locked position under its own gravity.

In some embodiments, the bracket includes a mounting column and a buckle, and the limiting member further includes a blocking portion disposed on a side surface of the main body; the main body is sleeved on the mounting column in such a manner that the limiting member is capable of rotating relative to the mounting column; and the blocking portion is configured to abut against the buckle to limit a movement of the main body along an axial direction of the mounting column.

In some embodiments, an end of the limiting portion includes an arc surface, and in the locked position, the arc surface is in contact with and fits with the hook to limit a position of the hook.

In some embodiments, the driving assembly includes a driving member mounted on the bracket; and a transmission member connected to the driving member; the transmission member is configured to engage with the limiting member, and the driving member is configured to drive the transmission member to engage with or disengage from the limiting member.

In some embodiments, the driving member further includes an electromagnet, and the transmission member includes a push rod disposed to penetrate the electromagnet, and an elastic portion sleeved on the push rod, two ends of the elastic portion respectively abutting against the electromagnet and a tail of the push rod; when the electromagnet is energized, the push rod is driven by the electromagnet to move in a first direction to push the limiting member to rotate to the unlocked position; and wherein when the electromagnet is deenergized, the push rod is driven by a restoring force generated by the elastic portion to move in a second direction in such a manner that the limiting member is capable of rotating to the locked position under its own gravity, the first direction being opposite to the second direction.

In some embodiments, the driving member further includes a driving circuit, and the transmission member includes an electromagnet, when the electromagnet is energized by the driving circuit, the limiting member is driven by a magnetic force generated by the electromagnet to rotate to the unlocked position; and when the electromagnet is not energized by the driving circuit, in absence of the magnetic force of the electromagnet, the limiting member is capable of moving back to the locked position from the unlocked position under its own gravity.

In some embodiments, the limiting member is a magnetic metal or alloy member.

In some embodiments, the limiting member has a magnetic unit provided thereon and configured to magnetically engage with the electromagnet.

Some embodiments of the present disclosure provide a household appliance. The household appliance includes a door body, a housing, and the latching structure of the embodiments of the present disclosure. The housing is connected to the door body in an openable and closable manner, the bracket and the driving assembly are mounted on the housing, and a snapping member is mounted on the door body.

In some embodiments, the household appliance further includes a control box disposed on the door body or the housing, and electrically connected to the driving assembly; and a switch key arranged on the control box; the switch key is configured to trigger an unlock instruction, the driving assembly being controlled by the control box to be energized based on the unlock instruction; and/or the switch key is configured to trigger a locking instruction, the driving assembly being controlled by the control box to be deenergized based on the locking instruction.

The household appliance further includes a sensitive switch arranged on the bracket and electrically connected to the control box, and a microwave generator arranged in the housing and electrically connected to the control box; in response to detecting, by the sensitive switch, that the hook is disengaged from the limiting portion, the microwave generator is controlled by the control box to stop working.

Some embodiments of the present disclosure provide a control method for a household appliance according to an embodiment of the present disclosure. The control method includes: controlling, when the door body is in a closed state and needs to be opened, the driving assembly to be energized based on the unlocking instruction; and driving, by the driving assembly in cooperation with the limiting member, the limiting member to switch to the unlocked position.

In some embodiments, the control method further includes: controlling, after a predetermined time period since the door body is opened, the driving assembly to be deenergized.

In the latching structure, the household appliance, and the control method for the household appliance of the present disclosure, when the driving assembly is engaged with the limiting member, the driving assembly drives the limiting member to switch to the unlocked position, and in the unlocked position, the limiting member avoids the hook and thus the hook can move to disengage from the limiting portion, such that the limiting member removes the limitation on the hook to implement the unlocking of the hook. In the unlocked position, the limiting member can avoid the hook, and the hook can move to engage with the limiting portion to implement the locking of the hook, so that the door body is closed to the housing. When the driving assembly is disengaged from the limiting member, the limiting member is switched to the locked position under its own gravity, and the limiting member is suitable for engaging with the hook to limit the position of the hook, which increases the difficulty of the hook disengaging from the limiting portion to implement the child lock function.

Some embodiments of the present disclosure provide a latching structure, which adds the steps of opening the door to avoid potential safety hazards when opening the door by mistake. The latching structure includes a snapping member, a bracket, a limiting member, and a driving assembly. The snapping member is mounted on a door body and includes a hook. The bracket is mounted on a housing. The bracket has a limiting plate configured to snap with the hook. The hook is capable of penetrating the bracket, and the door body is connected to the housing in an openable and closable manner. The limiting member is rotatably mounted to the bracket and capable of reciprocating between an unlocked position and a locked position. The limiting member is driven to be switched to the unlocked position when the driving assembly is engaged with the limiting member. The limiting member is switched to the locked position under its own gravity when the driving assembly is disengaged from the limiting member. The limiting member in the locked position is configured to limit a movement range of the hook, preventing the hook in a snapping state from being separated from the limiting plate. The limiting member in the unlocked position is configured to avoid the hook In certain embodiments, the limiting member includes a main body rotatably mounted on the bracket, an engagement portion extending from a first end of the main body and configured to engage with the driving assembly, and a limiting portion extending from a second end of the main body. A weight of the limiting portion is greater than a weight of the engagement portion. When the driving assembly is disengaged from the limiting member, the limiting portion is capable of moving from the unlocked position to the locked position under its own gravity.

In some embodiments, the bracket includes a mounting column and a buckle, and the limiting member further includes a blocking portion provided on a side wall of the main body; the main body is sleeved on the mounting column in such a manner that the limiting member is capable of rotating relative to the mounting column; and the blocking portion is configured to abut against the buckle to limit a movement of the main body along an axial direction of the mounting column.

In some embodiments, the latching structure further includes a restore member connected to the snapping member and the door body, and an elastic force direction of the restore member is parallel to a snapping direction of the hook and the limiting plate.

In some embodiments, when the hook is separated from the limiting plate and the limiting member is in the locked position, and when a first force externally applied to the snapping member is greater than a second force of the driving assembly acting on the limiting member, the hook is engaged with the limiting plate by overcoming a resistance of the limiting member.

In some embodiments, the driving assembly includes a driving member, and a transmission member configured to engage with the limiting member, the driving member being configured to drive the transmission member to engage with or disengage from the limiting member.

In some embodiments, the driving member further includes an electromagnet, and the transmission member includes: a push rod disposed to penetrate the electromagnet; and an elastic portion sleeved on the push rod, two ends of the elastic portion respectively abutting against the electromagnet and a tail of the push rod; when the electromagnet is energized, a head of the push rod is driven by the electromagnet to move in a first direction to push the limiting member to rotate to the locked position, and the elastic portion is elastically deformed; and when the electromagnet is deenergized, the head of the push rod is driven by a restoring force generated by the elastic portion to move in a second direction, the limiting member is disengaged from the head of the push rod, and the limiting member is capable of moving from the locked position to the unlocked position under its own gravity, the second direction being opposite to the first direction.

In some embodiments, the driving member further includes a driving circuit, and the transmission member includes the electromagnet; when the electromagnet is energized by the driving circuit, the limiting member is driven by a magnetic force generated by the electromagnet to rotate to the locked position; and when the electromagnet is not energized by the driving circuit, in absence of the magnetic force of the electromagnet, the limiting member is capable of moving back to the locked position from the unlocked position under its own gravity.

In some embodiments, the limiting member is a magnetic metal or alloy member.

In some embodiments, the limiting member has a magnetic unit provided thereon and configured to generate magnetic force matching with the electromagnet.

In some embodiments, the driving assembly further includes a fixing hole, the bracket further includes a mounting hole, the latching structure further includes a screw, the screw being configured to passe through the fixing hole and match with the mounting hole to fix the driving assembly to the bracket.

Some embodiments of the present disclosure provide a household appliance. The household appliance includes a door body, a housing, and the latching structure as described in the above embodiments, the snapping member is mounted on the door body, and the bracket and the driving assembly are mounted on the housing.

In some embodiments, the household appliance further includes a control box disposed on the door body or the housing, and electrically connected to the driving assembly; and a switch key arranged on the control box; the switch key is configured to trigger an unlock instruction, the driving assembly being controlled by the control box to be energized based on the unlock instruction; and/or the switch key is configured to trigger a locking instruction, the driving assembly being controlled by the control box to be deenergized based on the locking instruction.

In some embodiments, the household appliance further includes a sensitive switch arranged on the bracket and electrically connected to the control box, and a microwave generator arranged in the housing and electrically connected to the control box; in response to detecting, by the sensitive switch, that the hook is disengaged from the limiting portion, the microwave generator is controlled by the control box to stop working.

Some embodiments of the present disclosure provide a control method for a household appliance. The household appliance includes a door body, a housing, and the latching structure as described in the above embodiments, the snapping member is mounted on the door body, and the bracket and the driving assembly are mounted on the housing. The control method includes: controlling, when the driving assembly is engaged with the limiting member to allow the limiting member to be in the locked position, the driving assembly to be deenergized based on an unlocking instruction; and/or controlling, when the driving assembly is disengaged from the limiting member to allow the limiting member to be in the unlocked position, the driving assembly to be energized based on a locking instruction.

In some embodiments, the control method further includes: controlling, after a predetermined time since receiving the unlocking instruction, the driving assembly to drive the limiting member to move from the unlocked position to the locked position; or after the predetermined time since receiving the unlocking instruction and in response to detecting that the door body is closed, controlling the driving assembly to drive the limiting member to move from the unlocked position to the locked position.

In some embodiments, the control method further includes: after a second predetermined time since receiving the unlocking instruction and in response to detecting that the hook is engaged with the limiting plate, controlling the driving assembly to be energized.

Regarding the latching structure, the household appliance, and the control method for the household appliance according to the embodiments of the present disclosure, the driving assembly is required to be operated before the door body is opened, which adds the steps of the door opening action of the household appliance. Thus, the easy maloperation of the door opening action can be effectively prevented, and thus the use safety of the household appliance can be improved.

Additional aspects and advantages of the present disclosure will be set forth in part from the following description, and in part will be apparent from the following description, or learned by practice of the present disclosure.

BRIEF DESCRIPTION OF DRAWINGS

The above and/or additional aspects and advantages of the present disclosure will become apparent from the following description of embodiments taken in conjunction with the accompanying drawings, in which.

Figure 1:
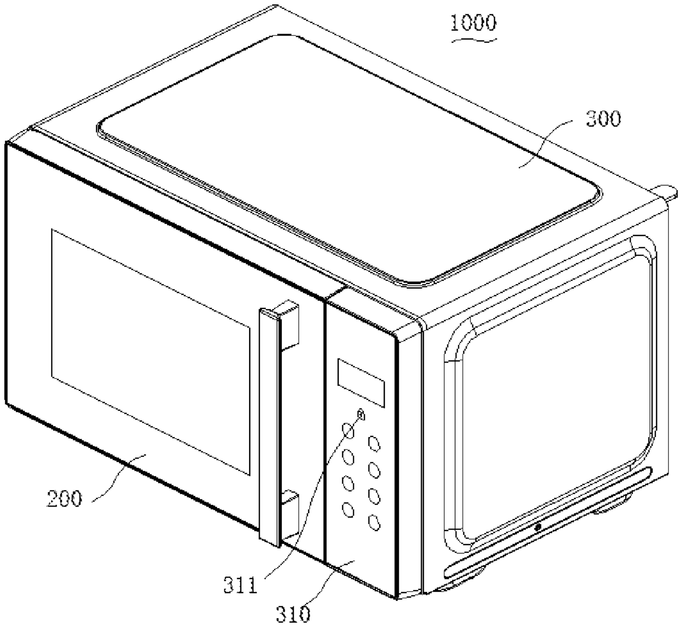
FIG. 1 is a three-dimensional structural schematic diagram of a household appliance according to some embodiments of the present disclosure.

Reference numbers of relevant components:

household appliance 1000, latching structure 100, door body 200, waist-shaped hole 201, first hook 202, mounting hole 205, housing 300, control box 310, switch key 311, sensitive switch 320, microwave generator 330, a restore member (elastic member) 400;

snapping member 10, hook 11, hook surface 111, body portion 130, moving portion 12, second hook 13;

bracket 20, limiting plate (limiting portion) 21, inclined surface 211, accommodating space 22, main body portion 23, mounting hole 231, support plate 233, opening hole 235, mounting column 25, buckle 26, accommodating groove 261, wall surface 27;

driving assembly 30, driving member 31, fixing hole 311, electromagnet 312, driving circuit 314, transmission member 32, push rod 321, head 3211, tail 3212, elastic portion 322, electromagnet 324, electromagnet 325, lead wire 313;

limiting member 40, main body 41, through hole 410, first end 411, second end 412, side wall 413, engagement portion 42, limiting portion 43, and blocking portion 44;

screw 60.

DESCRIPTION OF EMBODIMENTS

Embodiments of the present disclosure are described below in detail, examples of the embodiments are illustrated in accompanying drawings, and throughout the description, the same or similar reference signs represent the same or similar components or the components having the same or similar functions. The embodiments described below with reference to the accompanying drawings are exemplary and merely used to explain the present disclosure, rather than being construed as limitation on the present disclosure.

In the description of the present disclosure, it should be understood that the orientation or position relationship indicated by the terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", etc., is based on the orientation or position relationship illustrated in the drawings, and is only for the convenience of describing the present disclosure and simplifying the description, rather than indicating or implying that the defined device or element must have a specific orientation or must be constructed and operated in a specific orientation. Thus, the orientation or position relationship indicated by these terms cannot be understood as limitations of the present disclosure. In addition, the terms "first" and "second" are only used for purpose of description, and cannot be understood as indicating or implying relative importance or implicitly indicating the number of indicated technical features. Therefore, the features defined with "first" and "second" may explicitly or implicitly include at least one of the features. In the description of the present disclosure, "plurality" means at least two, unless otherwise specifically defined.

In the description of the present disclosure, it should be noted that, unless otherwise clearly specified and limited, terms such as "install", "mount", "connect to" and the like should be understood in a broad sense. For example, it may be a fixed connection or a detachable connection or connection as one piece; mechanical connection or electrical connection; direct connection or indirect connection through an intermediate; internal communication of two components or the engagement relationship between two components, unless otherwise clearly limited. For those of ordinary skill in the art, the specific meaning of the above-mentioned terms in the present disclosure can be understood according to specific circumstances.

The following describes a latching structure 100 according to an embodiment of the present disclosure with reference to FIG. 1 to FIG. 12.

Figure 2:
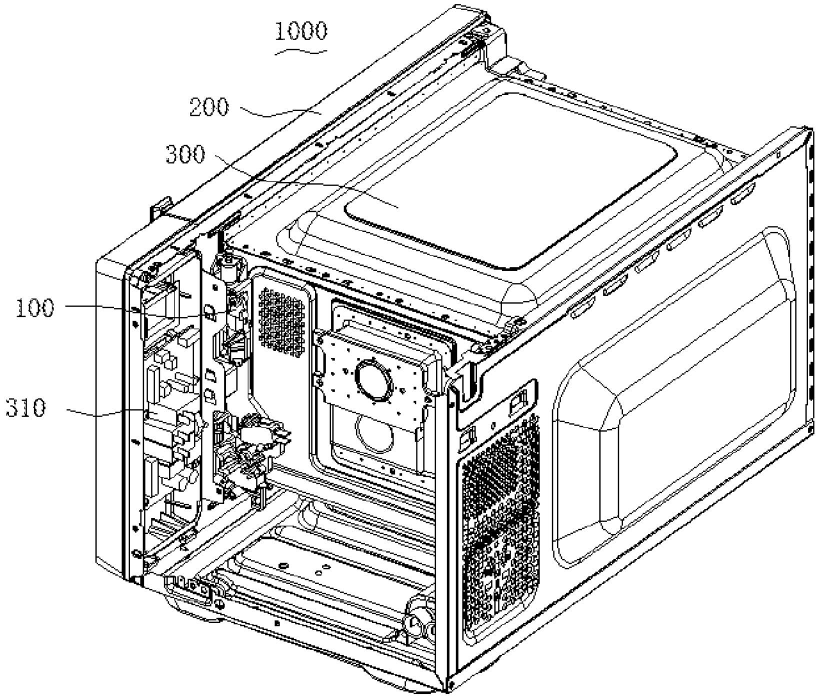
FIG. 2 is a partial three-dimensional structural schematic diagram of a household appliance according to some embodiments of the present disclosure.
Figure 3:
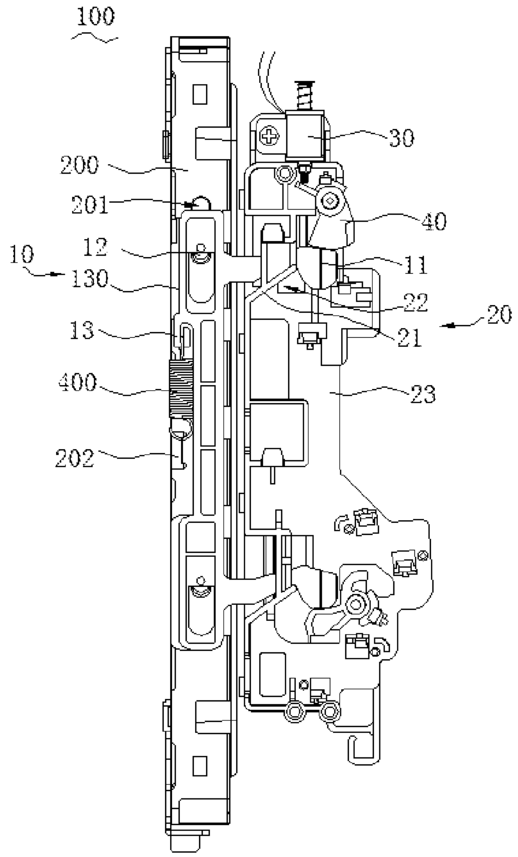
FIG. 3 is a three-dimensional structural schematic diagram of a latching structure according to some embodiments of the present disclosure.

Referring to FIG. 1 to FIG. 3, an embodiment of the present disclosure provides a latching structure 100. The latching structure 100 includes a snapping member 10, a bracket 20, a limiting member 40, and a driving assembly 30. The snapping member 10 is mounted on a door body 200, and includes a hook 11. The bracket 20 is mounted on a housing 300, and includes a limiting portion 21 configured to engage with the hook 11. The hook 11 can penetrate the bracket 20. The door body 200 is connected to the housing 300 in an openable and closable manner. The limiting member 40 is rotatably mounted to the bracket 20 and capable of reciprocating between an unlocked position and a locked position. The driving assembly 30 is configured to engage with or disengage from the limiting member 40. When the driving assembly 30 is engaged with the limiting member 40, the limiting member 40 is driven to be switched to the unlocked position; and when the driving assembly 30 is disengaged from the limiting member 40, the limiting member 40 is switched to the locked position under its own gravity. In the unlocked position, the limiting member 40 is configured to avoid the hook 11 in such a manner that the hook 11 is capable of moving to separate from or engage with the limiting portion 21; and in the locked position, the limiting member 40 is configured to fit with the hook 11 to limit a position of the hook 11. A door of a household appliance (such as a cooking appliance) can be opened by means of a button or by sliding or touching. The furnace door can be easily opened without applying external force or only with a small external force. The overall operation is simple and convenient and only requires one step, and thus children can also open the furnace door very easily. The door of the cooking appliance can be opened so easy and has no child lock function. During the use of the cooking appliance, there is a potential safety hazard that children may open the furnace door by themselves and get scalded by high-temperature items.

Referring to FIG. 7 to FIG. 11, in the latching structure 100 of the present disclosure, when the driving assembly 30 is engaged with the limiting member 40, the limiting member 40 is driven by the driving assembly 30 to switch to the unlocked position. In the unlocked position, the limiting member 40 can avoid the hook 11, the hook 11 can move to be disengaged from the limiting portion 21, and thus the limiting member 40 removes the limitation on the hook 11 to implement the unlocking of the hook 11. In the unlocked position, the limiting member 40 can avoid the hook 11, the hook 11 can move to be engaged with the limiting portion 21 to implement the locking of the hook 11, so that the door body 200 and the housing 300 are closed. When the driving assembly 30 is disengaged from the limiting member 40, the limiting member 40 is switched to the locked position under its own gravity, so that the limiting member 40 is suitable for fitting the hook 11 to limit the position of the hook 11, which increases the difficulty of the hook 11 detaching from the limiting portion 21, to implement the child lock function. In addition, it is simple to lock the hook 11 on the limiting portion 21 by the limiting member 40, and the limiting member 40 can be switched to the locked position under the action of its own gravity.

In the embodiment of the present disclosure, when the household appliance 1000 is placed on a horizontal plane, the first direction is a downward direction vertical to the ground, and the second direction is an upward direction vertical to the ground.

Figure 7:
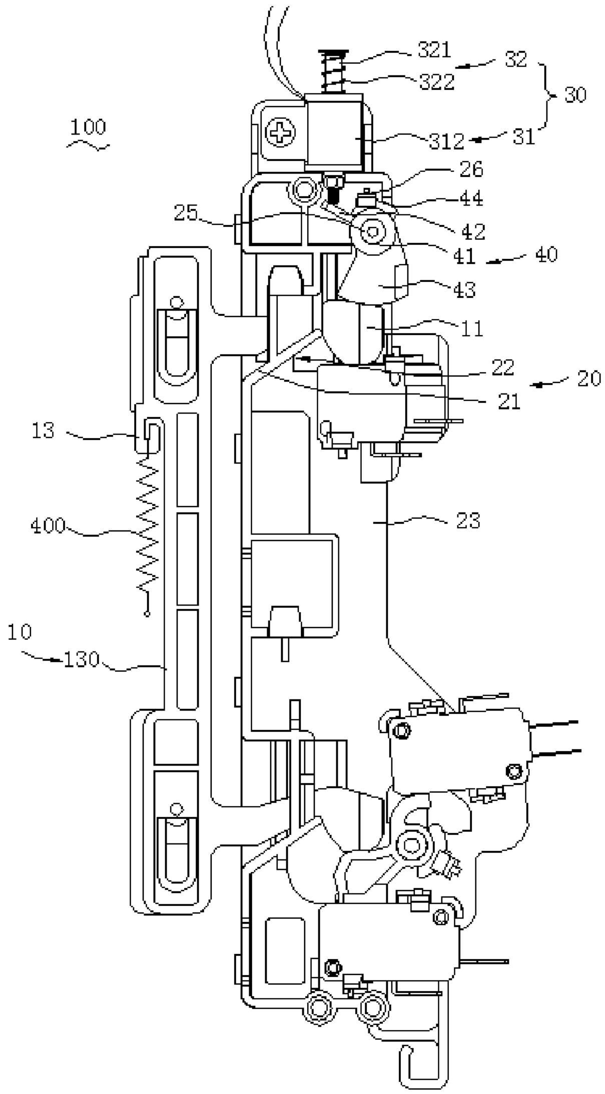
FIG. 7 is a structural schematic diagram of a limiting member of a latching structure in a locked position and a hook engaged with a limiting portion according to some embodiments of the present disclosure.
Figure 8:
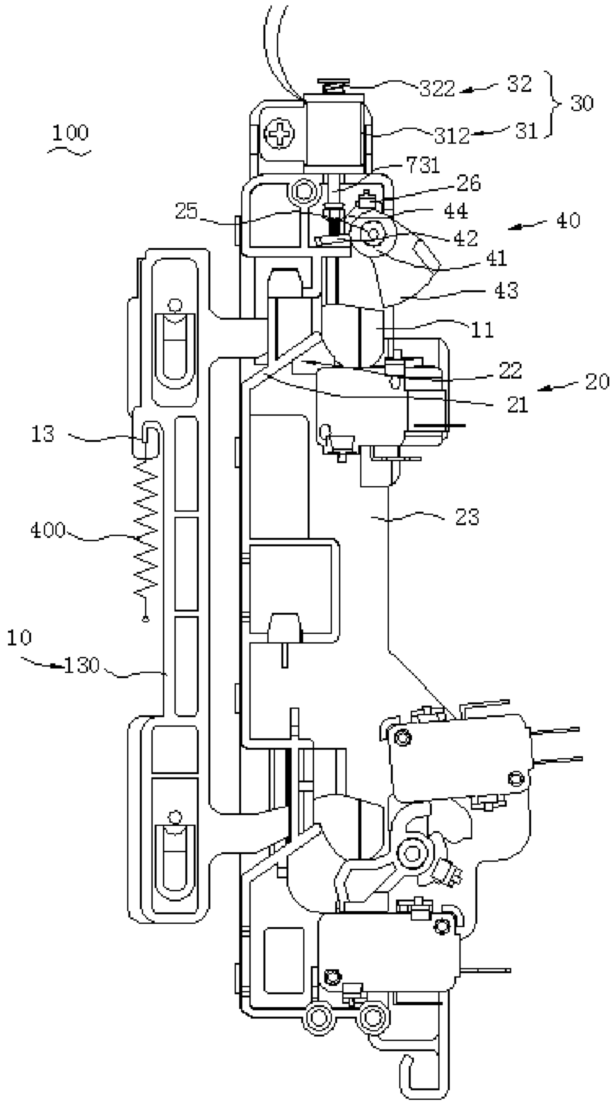
FIG. 8 is a structural schematic diagram of a limiting member of a latching structure in an unlocked position and a hook engaged with a limiting portion according to some embodiments of the present disclosure.
Figure 9:
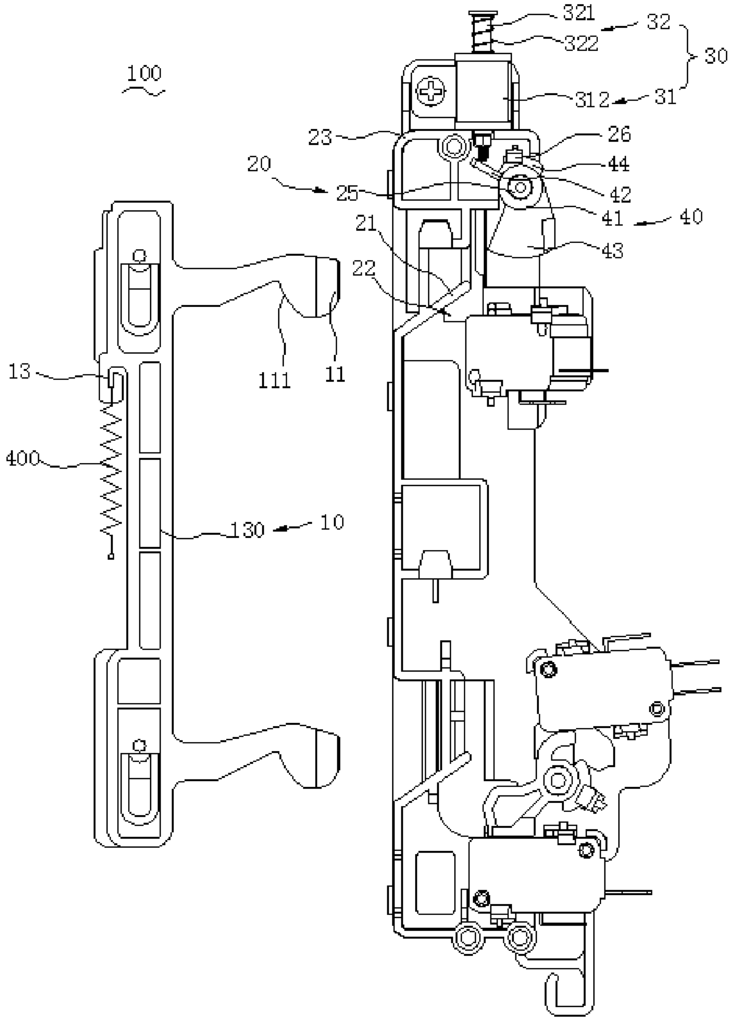
FIG. 9 is a structural schematic diagram of a limiting member of a latching structure in a locked position and a hook disengaged from the limiting portion according to some embodiments of the present disclosure.
Figure 10:
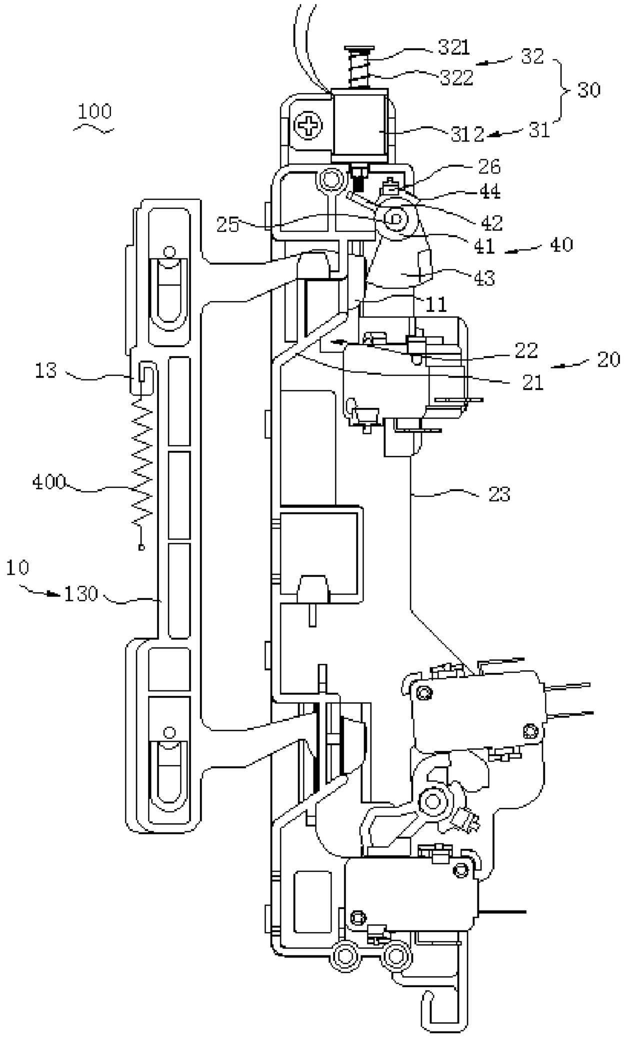
FIG. 10 is a structural schematic diagram of a limiting member of a latching structure in a middle position and a hook disengaged from a limiting portion according to some embodiments of the present disclosure.
Figure 11:
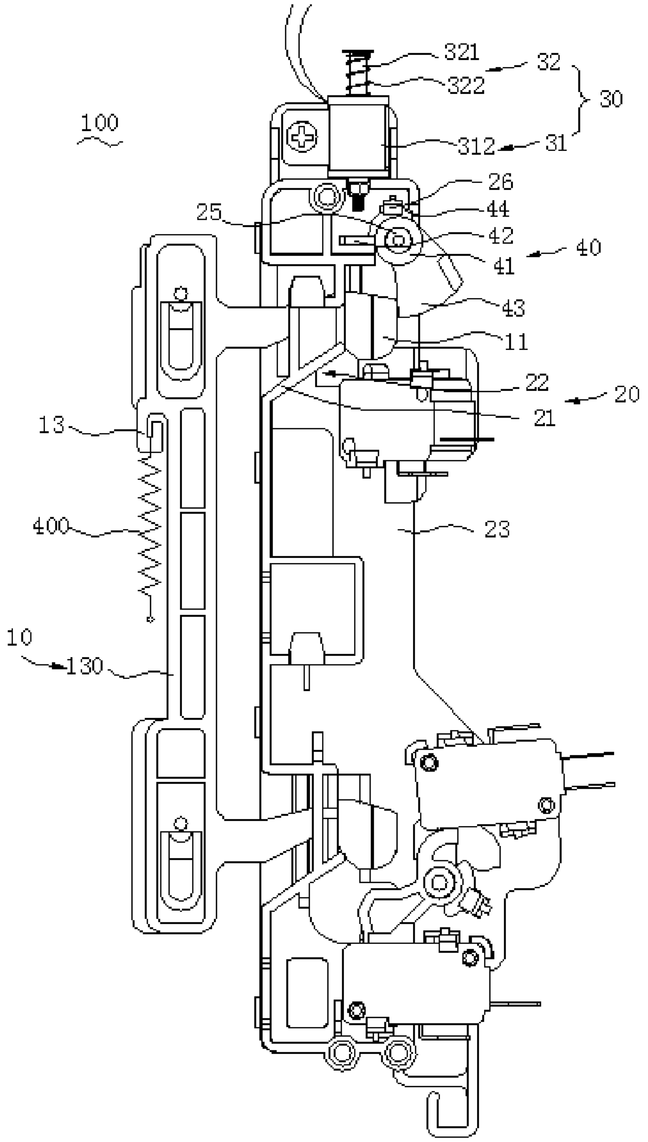
FIG. 11 is another structural schematic diagram of a limiting member in a middle position and a hook disengaged from a limiting portion according to some embodiments of the present disclosure.

It should be noted that, the locked position may refer to a position where the limiting member 40 is located under its own gravity, as illustrated in FIG. 3, FIG. 7 and FIG. 9. The unlocked position of the limiting member 40 may refer to a position where the limiting member 40 can avoid the hook 11 in such a manner that the hook 11 can move to be disengaged from the limiting portion 21, or it may refer to a position where the limiting member 40 can avoid the hook 11 in such a manner that the hook 11 can move to be engaged with the limiting portion 21, as illustrated in FIG. 8. The intermediate position is any position between the locked position and the unlocked position during the rotation of the limiting member 40, as illustrated in FIG. 10 and FIG. 11.

The latching structure 100 will be described in detail below in conjunction with the accompanying drawings.

Referring to FIG. 1 and FIG. 3, in some embodiments, the snapping member 10 further includes a body portion 130 mounted to the door body 200, the hook 11 extends from the body portion 130, and the hook 11 can engage with the limiting portion 21 to lock and fix the snapping member 10 to the bracket. When the limiting member 40 removes the limitation on the hook 11, the hook 11 can be disengaged from the limiting portion 21, so that the hook 11 extends out of the bracket 20.

In some embodiments, the body portion 130 and the hook 11 are formed as one piece, and thus the snapping member 10 has a simple structure. In some embodiments, the body portion 130 and the hook 11 are formed as separated structures, and the hook 11 can be mounted on the body portion 130 by welding, screwing, snapping or the like.

In some embodiments, when the hook 11 is disengaged from the limiting portion 21 and the limiting member 40 is in the locked position under its own gravity, the hook 11 can push the limiting member 40 to rotate to the unlocked position.

When the hook 11 penetrates the bracket 20, the hook 11 abuts against the limiting member 40 and pushes the limiting member 40 to rotate freely, so that the limiting member 40 located in the locked position under its own gravity can rotate from the locked position to the unlocked position, when the hook 11 is locked on the limiting portion 21, the locking of the hook 11 is implemented.

In the present disclosure, the limiting member 40 limits the hook 11 to exert the child lock function in a simple manner, and the pushing force applied when the door body 200 is closed can allow the limiting member 40 to fit with the hook 11 and to lock the hook 11 on the limiting portion 21. Thus, it is ensured that the door body 200 cannot be directly opened by pulling, and the door opening safety of the household appliance 1000 can be guaranteed.

In some embodiments, the number of the hooks 11 may be two, and the two hooks 11 are respectively mounted on both ends of the body portion 130. Similarly, the number of the limiting portions 21 can also be two, and the two limiting portions 21 engage with the two hooks 11, respectively, to close the door body 200 on the housing 300 (illustrated in FIG. 2).

Referring to FIG. 3, in some embodiments, the number of limiting members 40 may be one, the limiting member 40 is engaged with or disengaged from one of the hooks 11. The limiting member 40, when fitting with one of the hooks 11, limits this hook 11 engaged with the limiting portion 21 to implement the child lock function.

In other embodiments, the number of limiting members 40 may be two, in which one limiting member 40 is engaged with or disengaged from one of the hooks 11, and the other limiting member 40 is engaged with or disengaged from the other hook 11.

Figure 6:
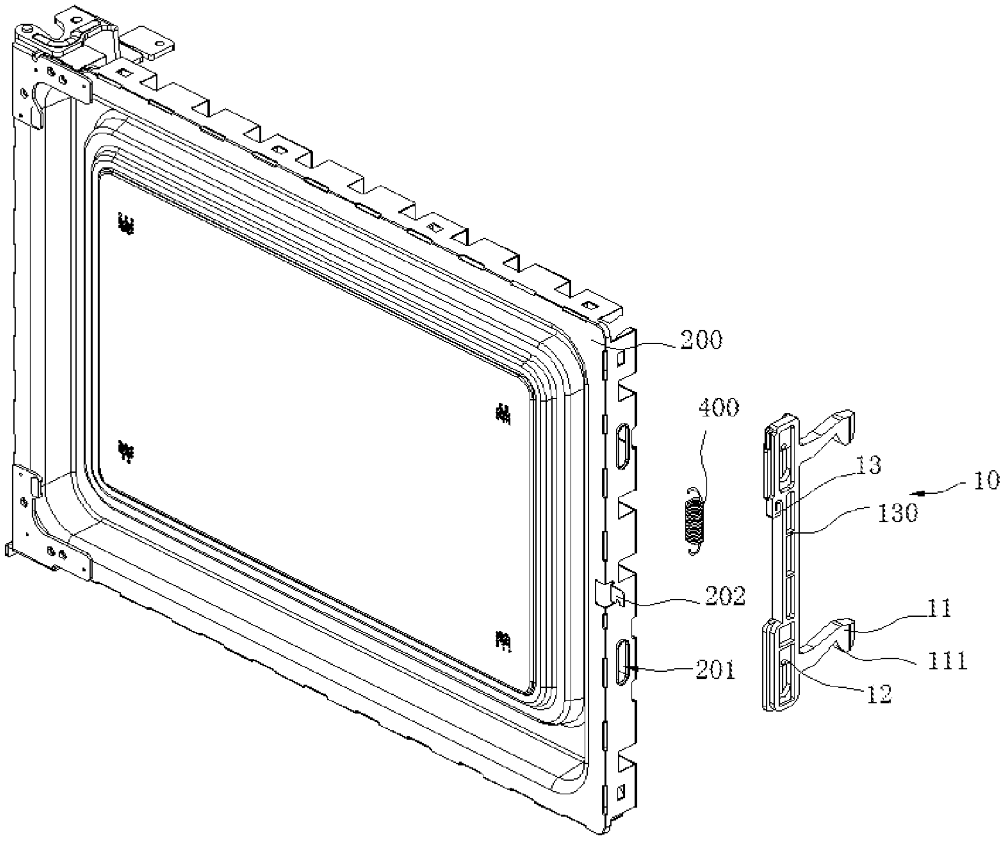
FIG. 6 is a three-dimensional exploded structural schematic diagram of an interlock bracket, a limiting member and a driving assembly in a latching structure according to some embodiments of the present disclosure.

Referring to FIG. 6, the body portion 130 is movably mounted on the door body 200. In some embodiments, the latching structure 100 further includes an elastic member 400, one end of the elastic member 400 is connected to the body portion 130, the other end of the elastic member 400 is connected to the door body 200, and the elastic member 400 is configured to continuously provide an elastic force for the limiting member 10 to move along the first direction.

For example, the door body 200 includes a first hook 202 and a waist-shaped hole 201, and the body portion 130 includes a moving portion 12 and a second hook 13. The first hook 202 and the second hook 13 are connected by the elastic member 400. The moving portion 12 is engaged with the waist-shaped hole 201 and can move in the waist-shaped hole 201 along the first direction or the second direction.

For example, the moving portion 12 moves in the waist-shaped hole 201. In the process of closing the door, when the hook 11 is engaged with the limiting portion 21 under the action of external force and is locked on the limiting portion 21, the moving portion 12 moves in the waist-shaped hole 201 along the second direction to stretch the elastic member 400 and produce deformation. When the hook 11 moves beyond the end portion of the limiting portion 21, the elastic member 400 is restored from the stretched state to drive the moving portion 12 and the hook 11 to move along the first direction, and thus the hook 11 is locked on the limiting member 21. In the process of opening the door, the hook 11 moves along the second direction, and at the same time, the moving portion 12 moves in the waist-shaped hole 201 along the second direction. When the hook 11 moves to the end portion of the limiting portion 21, the hook 11 can move along the inclined surface of the limiting portion 21 towards a side facing away from the bracket 20, and at the same time, the door body 200 is opened outwardly relative to the housing 300.

In some embodiments, an end portion of the hook 11 has a hook surface 111 capable of fitting with the limiting portion 21. When the user applies a pulling force on the door body 200 to open the door body 200, the hook surface 111 of the hook 11 slides along the end portion of the limiting portion 21 until the end portion of the hook 11 is higher than the end portion of the limiting portion 21 to ensure the door body 200 to be opened smoothly.

In some embodiments, the hook surface 111 is an arc surface, and thus the door body 200 can be opened by the hook 11 under the action of a very small pulling force.

Figure 4:
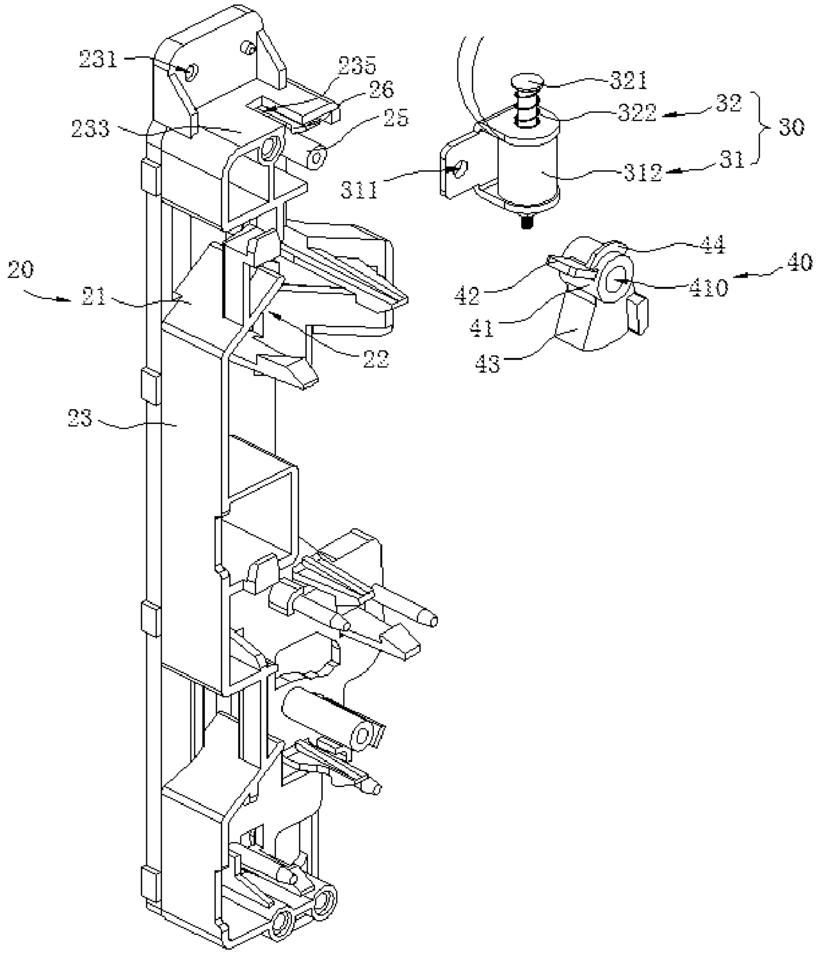
FIG. 4 is a three-dimensional exploded structural schematic diagram of a door body and a door hook assembly in a household appliance according to some embodiments of the present disclosure.
Figure 5:
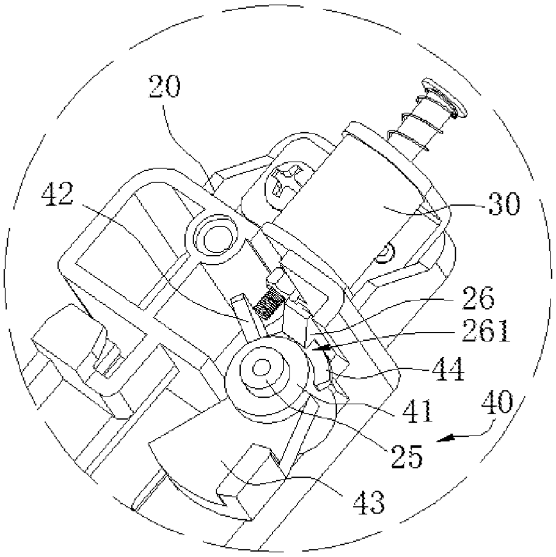
FIG. 5 is an enlarged schematic diagram of an engagement between a limiting member and a driving assembly in a latching structure according to some embodiments of the present disclosure.

Referring to FIG. 4 and FIG. 5, in some embodiments, the bracket 20 may further include a main body portion 23, a mounting column 25, and a buckle 26. The limiting portion 21, the mounting column 25 and the buckle 26 are all mounted on the main body portion 23. The mounting column 25 fits with the limiting member 40 to mount the limiting member 40 on the main body portion 23. The buckle 26 is configured to limit a displacement of the limiting member 40 mounted on the main body portion 23.

The limiting portion 21 is mounted on the main body portion 23 and inclined at a certain inclination angle, to define the accommodating space 22. When the hook 11 moves along the inclined surface of the limiting portion 21 to the end portion of the limiting portion 21 and falls into the accommodating space 22, the hook 11 is locked on the limiting portion 21, effectively preventing the hook 11 from detaching from the limiting portion 21.

Referring to FIG. 9 to FIG. 11, the mounting column 25 is in a cylindrical shape and is configured to mount the limiting member 40, and the cylindrical mounting column 25 enables the limiting member 40 to rotate freely with a small pulling force. When the hook 11 moves along the inclined surface of the limiting portion 21 and moves into the accommodating space 22, the limiting member 40 in the locked position can be rotated around the mounting column 25 by only applying a small pulling force to the hook 11. When the limiting member 40 is pushed to a state that the limiting member 40 just abuts against the hook 11, the hook 11 falls into the accommodating space 22 under the action of the elastic member 400. During the process of the hook 11 falling into the accommodating space 22, the pulling force exerted by the hook 11 to push the limiting member 40 to rotate to the unlocked position gradually decreases. When the hook 11 is separated from the limiting member 40, the limiting member 40 rotates from the unlocked position to the locked position under its own gravity, so as to limit the hook 11 in the accommodating space 22.

In some embodiments, the buckle 26 can be made of rubber material to facilitate the mounting of the limiting member 40.

Referring to FIG. 5, the buckle 26 has an accommodating groove 261 defined thereon. A part of the structure of the limiting member 40 is limited in the accommodating groove 261 to prevent the limiting member 40 from moving along the axial direction of the mounting column 37.

In certain embodiments, the latching structure 100 further includes a driving assembly 30. The driving assembly 30 is engaged with or disengaged from the limiting member 40. When the driving assembly 30 is engaged with the limiting member 40, the driving assembly 30 is configured to drive the limiting member 40 to rotate from the locked position to the unlocked position. The limiting member 40 limits the hook 11 to the position where the hook 11 is locked on the limiting portion 21, the driving assembly 30 drives the limiting member 40 to rotate from the locked position to the unlocked position, so as to release the limitation on the hook 11 exerted by the limiting member 40.

Referring to FIG. 4, FIG. 5 and FIG. 7, in some embodiments, the limiting member 40 includes a main body 41, a limiting portion 43, and an engagement portion 42. The main body 41 is rotatably mounted on the bracket 20. The engagement portion 42 is mounted on a side surface of the main body 41 and configured to engage with the driving assembly 30. The limiting portion 43 is mounted on a side surface of the main body 41 and configured to limit the hook 11 on the limiting portion 21. The hook 11 can push the limiting portion 43 to move to the unlocked position. A weight of the limiting portion 43 is greater than a weight of the engagement portion 42. When the driving assembly 30 is disengaged from the engagement portion 42, the limiting portion 43 can move from the unlocked position to the locked position under its own gravity to limit the hook 11 on the limiting portion 21.

The main body 41 has a through hole 410 defined thereon, and the through hole 410 fits with the mounting column 25 to integrally mount the limiting member 40 on the bracket 20. For example, the main body 41 is sleeved on the mounting column 25 through the through hole 410, so that the limiting portion 43 can rotate relative to the mounting column 25 with a small pulling force, and the main body 41 and the mounting column 25 can be connected in a simple way.

The limiting member 40 further includes a blocking portion 44. The blocking portion 44 extends from the main body 41 toward one side of the driving assembly 30. The blocking portion 44 extends into the accommodating groove 261 defined by the buckle 26, and can limit the movement of the limiting member 40 along an axial direction (an extending direction) of the mounting column 25 when the limiting member 40 rotates along the mounting column 25. In the present disclosure, the limiting member 40 is rotatably fixed on the bracket 20 through the fitting between the through hole 410 and the mounting column 25 and the limitation between the blocking portion 44 and the buckle 26. Such a connection is simple and can be easily disassembled and replaced. In addition, the limiting member 40 does not need to be mounted on the bracket 20 by means of screwing, welding, etc., so that an additional driving motor is not required to drive the limiting member 40 to rotate. In this way, the rotation of the limiting member 40 can be easily implemented.

In some embodiments, the blocking portion 44 is connected to the engagement portion 42. On the side surface of the main body 41, the blocking portion 44 extends from a cooperating member 55 along an extending direction of the side surface of the main body 41 for a certain length, and the extension length of the blocking portion 44 along the extension direction of the side surface of the main body 41 can be set based on the rotation angle of the limiting member 40. For example, the arc length according to a certain angle by which the limiting member 40 is rotated can be calculated by using an arc length formula, and then the extension length of the blocking portion 44 can be determined based on the arc length. For example, the extension length of the blocking portion 44 is greater than or equal to the arc length, so that the limiting member 40 always has a limiting effect between the blocking portion 44 and the buckle 26 during the rotation process, preventing the limiting member 40 from moving along the axial direction of the mounting column 37 during the rotation process. In this way, the limiting member 40 is prevented from disengaging from the bracket 20.

Referring to FIG. 3 or FIG. 7, when the limiting member 53 is in the locked position and limits the rotation of the hook 11, the limiting member 53 can abut against the surface of the hook 11, or there is a certain gap between the limiting member 53 and the surface of the hook 11. The gap is smaller than a distance, by which the hook 11 moves away from the accommodating space 22 along the second direction.

In some embodiments, a cross section of the limiting member 53 is fan-shaped, and the end portion of the limiting member 53 includes an arc surface, and the arc surface is in contact with the hook 11 to limit a position of the hook 11. When the limiting member 40 is in the locked position and the hook 11 is engaged with the limiting portion 21, the arc surface matches with the surface of the hook 11. In other embodiments, the cross-section of the limiting member 53 is circular or square. At this time, there is a gap between the limiting member 53 and the surface of the hook 11 to ensure that the limiting member 53 can rotate from the locked position to the unlocked position.

For example, the limiting portion 43 limits the hook 11 to be locked in the accommodating space 22 of the limiting portion 21. When the door body 200 needs to be opened, the driving assembly 30 drives the engagement portion 42 to rotate, and the engagement portion 42 drives the limiting portion 43 to rotate from the locked position to the unlocked position. When the limiting portion 43 rotates on the surface of the hook 11 from the locked position to the unlocked position, compared with the square end portion of the limiting portion 43, the fan-shaped or circular end portion of the limiting portion 43 only needs to have a very small distance from the hook 11 to allow the rotation of the limiting portion 43 on the surface of the hook 11 from the locked position to the unlocked position under the driving of the driving assembly 30, so as to release the locking of the hook 11.

In some embodiments, an included angle between a side surface of the limiting portion 43 close to the limiting portion 21 and a side surface of the engagement portion 42 facing toward the limiting portion 21 is smaller than 180°.

In addition, the weight of the limiting portion 43 is greater than the weight of the engagement portion 42, so that the limiting portion 43 rotates from the unlocked position to the locked position under its own gravity, without requiring the driving of the driving assembly 30. In this way, the automatic locking of the limiting portion 43 can be achieved, and at the same time, the power consumption of the household appliance 1000 can be effectively reduced, and thus the household appliance 1000 can be more energy-saving.

Referring to FIG. 4, in some embodiments, the driving assembly 30 includes a driving member 31, and a transmission member 32 connected with the driving member 31. The driving member 31 is mounted on the bracket 20. The transmission member 32 is configured to engage with the limiting member 40, and the driving member 31 is configured to drive the transmission member 32 to engage with or disengage from the limiting member 40.

Referring to FIG. 7, for example, the transmission member 32 corresponds to the engagement portion 42, and the driving member 31 is configured to drive the transmission member 32 to engage with or disengage from the engagement portion 42.

In an embodiment, the driving member 31 further includes an electromagnet 312, and the transmission member 32 includes a push rod 321 and an elastic portion 322. The push rod 321 is disposed to penetrate the electromagnet 312. The elastic portion 322 is sleeved on the push rod 321, two ends of the elastic portion 322 respectively abutting against the electromagnet 312 and a tail of the push rod 321. When the electromagnet 312 is energized, the push rod 321 is driven by the electromagnet 312 to move along the first direction to push the limiting member 40 to rotate to the unlocked position. When the electromagnet 312 is deenergized, the push rod 321 is driven by a restoring force generated by the elastic portion 322 to move along the second direction in such a manner that the limiting member 40 rotates to the locked position under its own gravity. The first direction is opposite to the second direction.

Referring to FIG. 7 and FIG. 8, in the embodiment of the present disclosure, the included angle between the side surface of the limiting portion 43 close to the limiting portion 21 and the side surface of the engagement portion 42 facing toward the limiting portion 21 is smaller than 180°. The driving member 31 only needs to drive the transmission member 32 to move linearly along the first direction or the second direction, so that the transmission member 32 can drive the engagement portion 42 to rotate. In this way, the structure of the limiting member 40 is simple and the manufacturing cost is low.

Referring to FIG. 4 and FIG. 5, for example, the main body portion 23 of the bracket 20 has a mounting hole 231 defined thereon, the driving member 31 has a fixing hole 311 defined thereon, the mounting hole 231 is engaged with the fixing hole 311, and the driving assembly 30 is integrally mounted on the main body portion 23 by means of screw connection.

The main body portion 23 further includes a support plate 233, and the driving assembly 30 can be integrally placed on and thus supported by the support plate 233. A part of the support plate 233 corresponding to the push rod 321 is formed with an opening hole 235. Under the driving of the driving member 31, the push rod 321 moves in the opening hole 235 along the first direction or the second direction to engage with or disengage from the engagement portion 42.

Referring to FIG. 9 to FIG. 11, when the electromagnet 312 is not energized, an end of the push rod 321 facing away from the engagement portion 42 protrudes from the electromagnet 312, and an end of the push rod 321 close to the engagement portion 42 is spaced apart from the engagement portion 42. When the limiting portion 43 rotates from the unlocked position to the locked position under the weight of the limiting portion 43 (the limiting portion 43 is switched from the state illustrated in FIG. 8 to the state illustrated in FIG. 9), the engagement portion 42 will not collide with the push rod 321. When the hook 11 falls into the accommodating space 22 of the limiting portion 21, the limiting portion 43 can limit the hook 11 in the accommodating space 22 in the initial state to ensure that the door body 200 cannot be directly opened by pulling, thereby guaranteeing the door opening safety of household appliance 1000 (as illustrated in FIG. 1).

Referring to FIG. 7 and FIG. 8, when the door body 200 (as illustrated in FIG. 1) needs to be opened, the household appliance 1000 continuously supplies power to the electromagnet 312 for 10 seconds. The electromagnet 312 generates an attraction force and pushes the push rod 321 toward the side where the engagement portion 42 is located. The push rod 321 pushes the engagement portion 42 to rotate along the first direction, and the engagement portion 42 drives the limiting portion 43 to rotate toward the unlocked position. When the limiting portion 43 rotates to the unlocked position, the hook 11 is released from the limitation, and an external force is applied to the door body 200. In this way, the hook 11 extends out of the accommodating space 22, and the limiting portion 43 abuts against the side surface of the hook 11. At this time, the household appliance 1000 can deenergize the electromagnet 312, and the door body 200 can be opened by continuously applying the external force. In this way, the household appliance 1000 can be added with the child lock function, the power consumption of the household appliance 1000 can also be effectively reduced, and thus the household appliance 1000 is more energy-saving.

Figure 12:
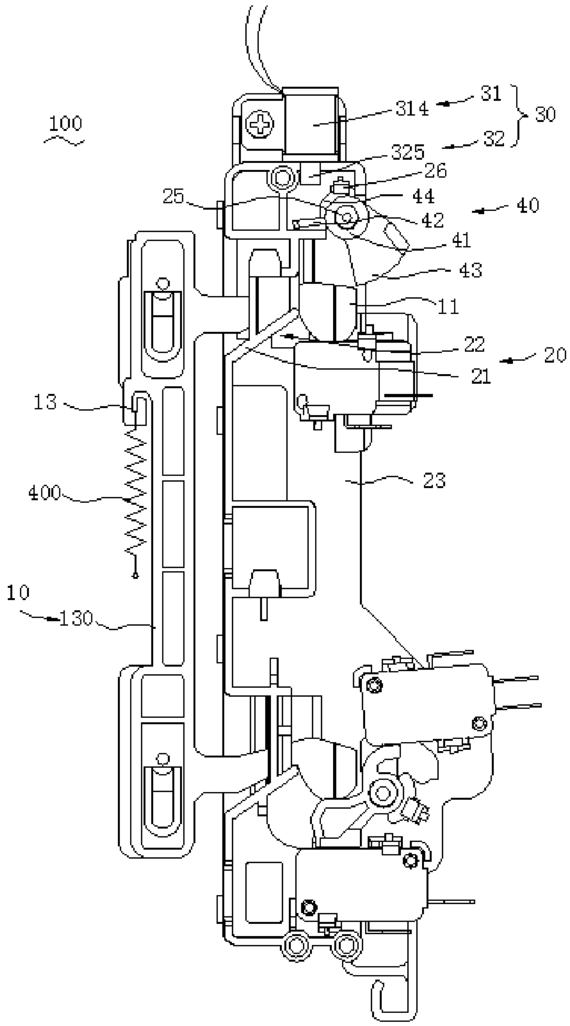
FIG. 12 is a structural schematic diagram of a transmission member of a latching structure including an electromagnet according to some embodiments of the present disclosure.

Referring to FIG. 12, in another embodiment, the driving member 31 further includes a driving circuit 314, and the transmission member 32 includes an electromagnet 325, which may have the same structure as the electromagnet 312 of the driving member 31. When the electromagnet 325 is energized by the driving circuit 314, the electromagnet 325 and the limiting member 40 repel each other, so that the limiting member 40 is rotated to the unlocked position. When the electromagnet 325 is not energized by the driving circuit, in absence of the repulsive force between the electromagnet 325 and the limiting member 40, the limiting member 40 moves back to the locked position from the unlocked position under its own gravity.

The driving circuit 713 is configured to switch the energizing and deenergizing states of the electromagnet 325. The limiting member 40 is a magnetic material such as a magnetic metal or alloy member; or, the limiting member 40 has a magnetic unit provided thereon and configured to generate a repulsive force by engaging with the electromagnet 325. For example, the engagement portion 42 of the limiting member 40 is a magnetic material; or the engagement portion 42 has a magnetic unit provided thereon.

When the electromagnet 325 is energized by the driving circuit 314, the electromagnet 325 generates a magnetic force, and the magnetism of the electromagnet 325 is the same as that of the engagement portion 42, so as to generate a repulsive force acting on the electromagnet 325. The engagement portion 42 and the electromagnet 325 repel each other, and the engagement portion 42 is pushed to rotate counterclockwise until the limiting portion 55 rotates to the maximum stroke position of the counterclockwise rotation, so that the limiting portion 43 removes the limitation on the hook 11. When the electromagnet 325 is continuously energized, the repulsive force of the electromagnet 325 keeps the limiting member 40 in the unlocked position.

When the electromagnet 325 is not energized by the driving circuit 314, in absence of the magnetic force of the electromagnet 325, the electromagnet 325 does not generate the repulsive force acting on the engagement portion 42, and thus the limiting member 40 rotates back to the locked position under the action of gravity.

In certain embodiments, when the electromagnet 325 is energized by the driving circuit 314, the magnetic force generated by the electromagnet 325 drives the limiting member 40 to rotate to the unlocked position. When the electromagnet 325 is not energized by the driving circuit 314, in absence of the magnetic force of the electromagnet 325, the limiting member 40 moves back to the locked position from the unlocked position under its own gravity.

In an embodiment, the driving circuit 314 and the electromagnet 325 are arranged laterally relative to the bracket 20, and the engagement portion 42 is arranged at an appropriate position of the limiting member 40 (for example, compared with FIG. 12, the engagement portion 42 is arranged on the right side instead), the electromagnet 325 is arranged on the left side of the engagement portion 42. When the electromagnet 325 is energized by the driving circuit 314, the electromagnet 325 generates a magnetic force, and the magnetism of the electromagnet 325 is opposite to the magnetism of the engagement portion 42 of the limiting member 40, the electromagnet 325 generates a mutually attractive magnetic force to attract the engagement portion 42 to rotate counterclockwise, thereby driving the limiting portion 43 to rotate counterclockwise to the unlocked position. When the electromagnet 325 is continuously energized, the attractive force of the electromagnet 325 keeps the limiting member 40 in the unlocked position.

When the electromagnet 325 is not energized by the driving circuit 314, in absence of the magnetic force of the electromagnet 325, the electromagnet 325 does not generate the repulsive force acting on the engagement portion 42, and the limiting member 40 rotates back to the locked position under the action of gravity.

In another embodiment, the driving circuit 314 and the electromagnet 325 are arranged laterally relative to the bracket 20, and the engagement portion 42 is arranged at an appropriate position of the limiting member 40 (for example, compared with FIG. 12, the engagement portion 42 is arranged on the right side instead), the electromagnet 325 is arranged on the right side of the engagement portion 42. When the electromagnet 325 is energized by the driving circuit 314, the electromagnet 325 generates a magnetic force, the magnetism of the electromagnet 325 is the same as the magnetism of the engagement portion 42 of the limiting member 40, and the electromagnets 325 generates a mutually repulsive magnetic force to push the engagement portion 42 to rotate counterclockwise, thereby driving the limiting portion 43 to rotate counterclockwise to the unlocked position. When the electromagnet 325 is continuously energized, the repulsive force of the electromagnet 325 keeps the limiting member 40 in the unlocked position.

When the electromagnet 325 is not energized by the driving circuit 314, in absence of the magnetic force of the electromagnet 325, the electromagnet 325 does not generate the repulsive force acting on the engagement portion 42, and the limiting member 40 rotates back to the locked position under the action of gravity.

A latching structure 100 according to another embodiment of the present disclosure is described below with reference to FIG. 14 to FIG. 24.

The latching structure 100 includes a snapping member 10, a bracket 20, a limiting member 40, and a driving assembly 30.

Figure 17:
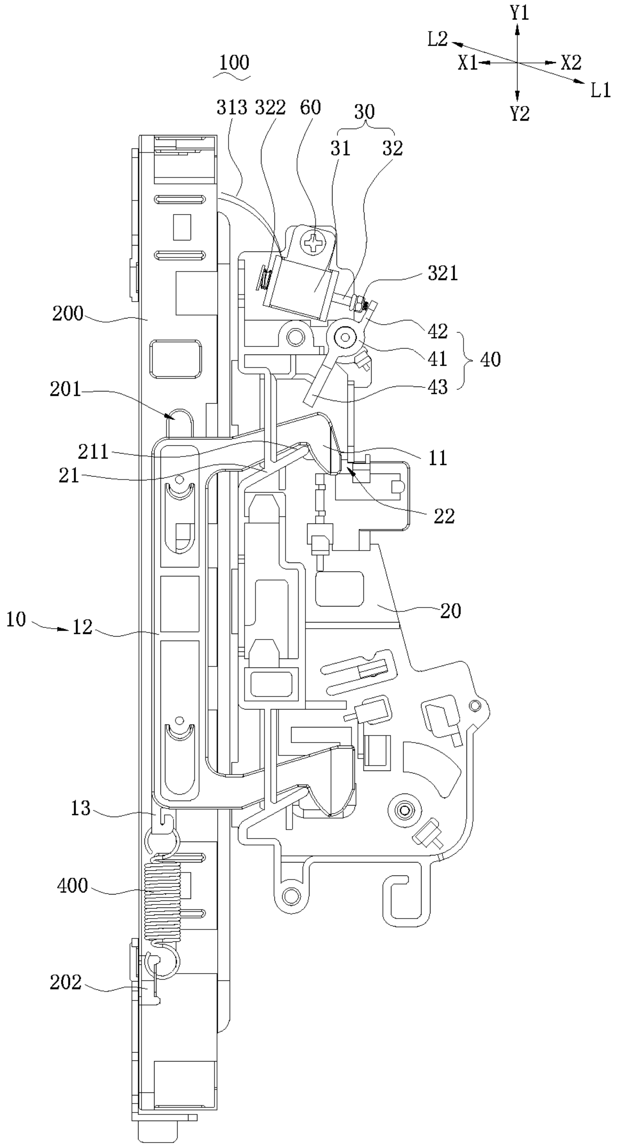
FIG. 17 is a structural schematic diagram of a latching structure according to some embodiments of the present disclosure.

Referring to FIG. 17, the snapping member 10 is mounted on a door body 200, and the snapping member 10 includes a hook 11. The bracket 20 is mounted on a housing 300, the bracket 20 includes a limiting portion 21 configured to snap with the hook 11, and the limiting portion 21 is a limiting plate 21. When the door body 200 is closed, the hook 11 can penetrate the bracket 20 to engage with the limiting plate 21 to prevent the door body 200 from being opened.

Figure 18:
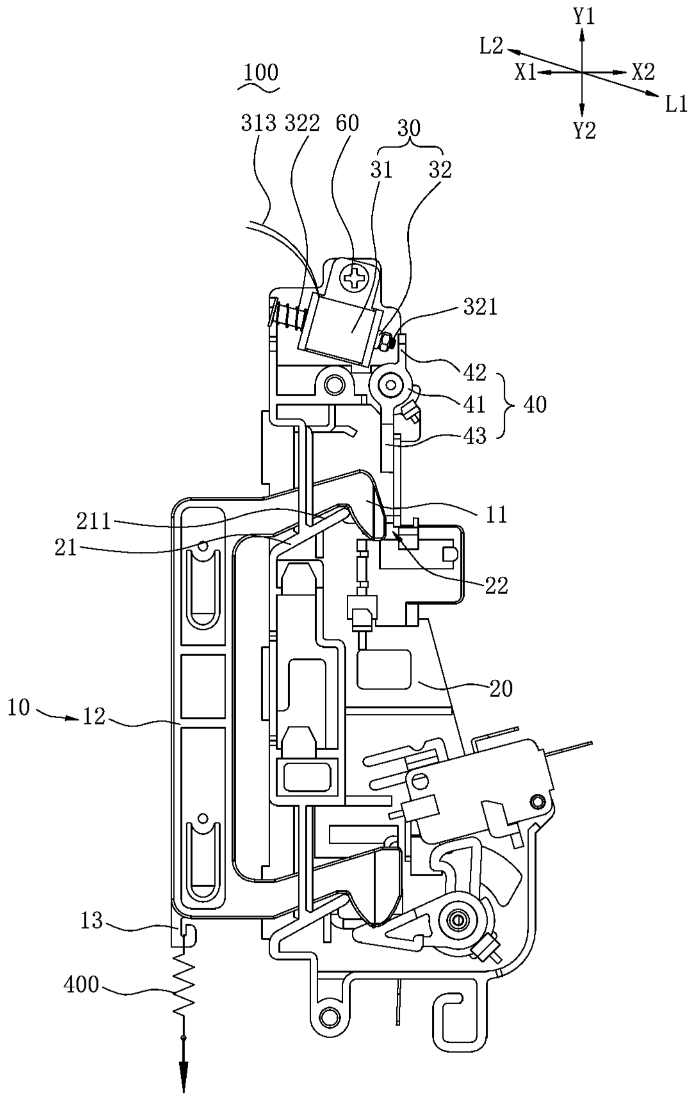
FIG. 18 is a structural schematic diagram of a latching structure according to some embodiments of the present disclosure.

Referring to FIG. 17 and FIG. 18, the limiting member 40 is rotatably mounted on the bracket 20 and can reciprocate between an unlocked position and a locked position.

In the embodiment illustrated in FIG. 17, the limiting member 40 is in the locked position. When the limiting member 40 is in the locked position, the limiting member 40 limits a movement range of the hook 11 to prevent the hook 11 in the engaged state from separating from the limiting plate 21, thereby preventing the door body 200 from being opened.

In the embodiment illustrated in FIG. 18, the limiting member 40 is not subjected to the external force and is in the unlocked position. When the limiting member 40 is in the unlocked position, the limiting member 40 is located outside a path along which the hook 11 is detached from the bracket 20, and thus the limiting member 40 avoids the hook 11, so that the hook 11 can be separated from the limiting plate 21 to open the door body 200.

Referring to FIG. 17, the driving assembly 30 is configured to engage with or disengage from the limiting member 40. When the driving assembly 30 is engaged with the limiting member 40, the driving assembly 30 drives the limiting member 40 to rotate to the locked position from the unlocked position. Referring to FIG. 18, when the driving assembly 30 is disengaged from the limiting member 40, the limiting member 40 rotates from the locked position to the unlocked position under its own gravity. In this way, by controlling the engagement and disengagement between the driving assembly 30 and the limiting member 40, the limiting member 40 can be selectively kept in the locked position to limit the movement range of the hook 11, and thus the hook 11 is kept being engaged with the limiting plate 21; and the limiting member 40 can be kept in the unlocked position to avoid the hook 11, and thus the hook 11 can be separated from the limiting plate 21.

Referring to FIG. 14 to FIG. 17, when the hook 11 is snapped on the limiting plate 21, the door body 200 is closed on the housing 300, and the limiting member 40 is kept in the locked position by the driving of the driving assembly 30, such that the hook 11 can be prevented from being detached from the limiting plate 21, and it is avoided that the users, especially children who are not accompanied by adults, easily open the door body 200 by maloperation.

Referring to FIG. 18, when the door 200 needs to be opened, the driving assembly 30 is disengaged from the limiting member 40, and the limiting member 40 rotates from the locked position to the unlocked position under its own gravity, so that the limiting member 40 avoids the hook 11. When the limiting member 40 is in the unlocked position to avoid the hook 11, the door body 200 can be pulled to separate the hook 11 from the limiting plate 21 and allow the hook 11 to move from the inside of the bracket 20 to the outside of the bracket 20, so that the door body 200 is opened from the housing 300.

With the latching structure 100 of the embodiment of the present disclosure, the driving assembly 30 is required to be operated before the door body 200 is opened, which adds the steps of the door opening action of the household appliance 1000. Thus, the easy maloperation of the door opening action can be effectively prevented, and thus the use safety of the household appliance 1000 can be improved.

Referring to FIG. 17, in some embodiments, the bracket 20 has an accommodating space 22 defined therein, and the limiting plate 21 disposed on the bracket 20 includes an inclined surface 211. In the process of closing the door, the hook 11 moves toward the accommodating space 22 along the inclined surface 211 of the limiting plate 21. When the hook 11 moves beyond the inclined surface 211 and approaches the end of the accommodating space 22, the hook 11 falls into the accommodating space 22. A side of the accommodating space 22 is blocked by the limiting plate 21, and the hook 11 is snapped on the limiting plate 11, such that the hook 11 cannot directly move away from the bracket 20 along an X1 direction.

When the door body 200 needs to be opened, the hook 11 shall be lifted along a second direction L2 to remove the engagement between the hook 11 and the limiting plate 21, so that the hook 11 moves and leaves the accommodating space 22 in a path, along which the hook 11 is detached from the limiting plate 21. After the hook 11 leaves the accommodating space 22, it can move along the first direction L1 to detach from the bracket 20. When the hook 11 is detached from the bracket 20, the door body 200 can be opened relative to the housing 300.

In other embodiments, the structure of the bracket 20 may not be the same as that illustrated in FIG. 17, but there is still a path for the hook 11 to disengage from the limiting plate 21. The limiting member 40 in the locked position is configured to block the disengagement path, so as to prevent the hook 11 from being detached from the limiting plate 21. The limiting member 40 in the unlocked position is configured to remove the blocking of the disengagement path, so that the hook 11 can be freely detached from the limiting plate 21.

Referring to FIG. 17, in some embodiments, when the limiting member 40 is in the locked position, the limiting member 40 is located above the accommodating space 22 to limit the movement range of the hook 11, thereby preventing the hook 11 from leaving the accommodating space 22 and maintaining the engagement between the hook 11 and the limiting plate 21.

Figure 19:
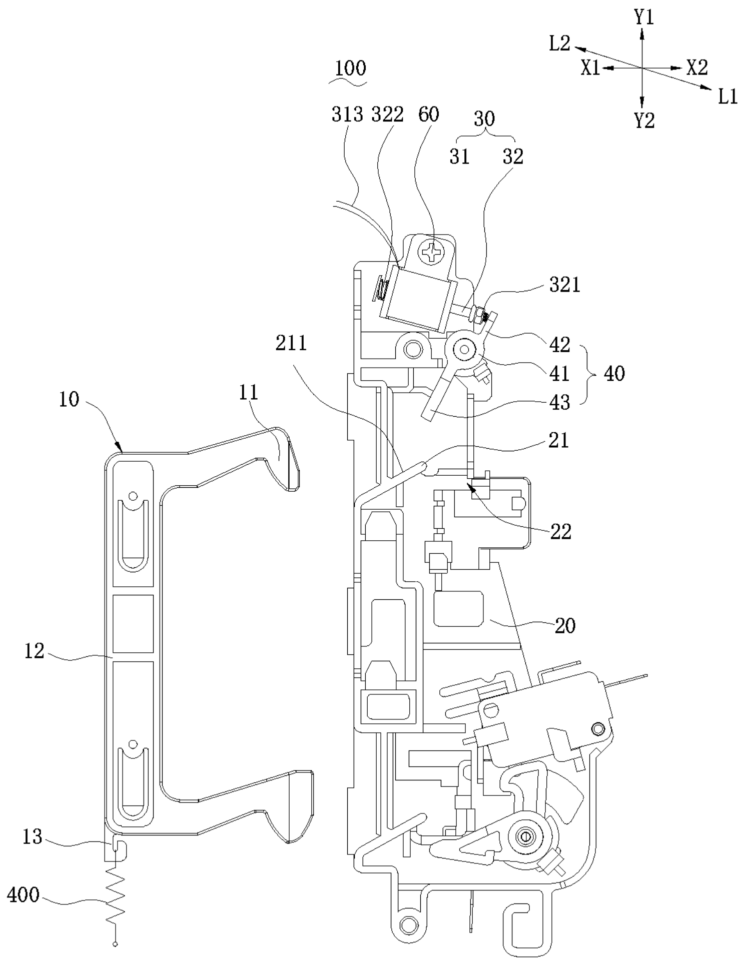
FIG. 19 is a structural schematic diagram of a latching structure according to some embodiments of the present disclosure.

Referring to FIG. 19, in some embodiments, when the door body 200 is opened, the hook 11 is separated from the limiting plate 21, and the driving assembly 30 is engaged with the limiting member 40 to allow the limiting member 40 to be in the locked position. When a first force is applied to close the door 200 and the applied first force is greater than a second force of the driving assembly 30 acting on the limiting member 40, the hook 11 can overcome the resistance of the limiting member 40 to push the limiting member 40 to rotate to the unlocked position, so that the hook 11 can move to the accommodating space 22 and engage with the limiting plate 21.

Figure 15:
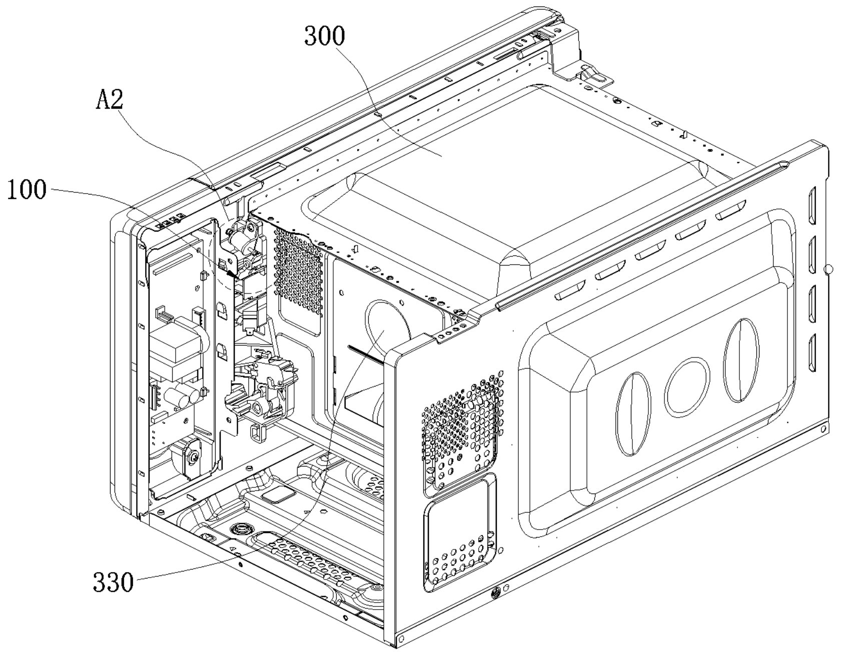
FIG. 15 is a three-dimensional structural schematic diagram of a furnace body according to some embodiments of the present disclosure.
Figure 16:
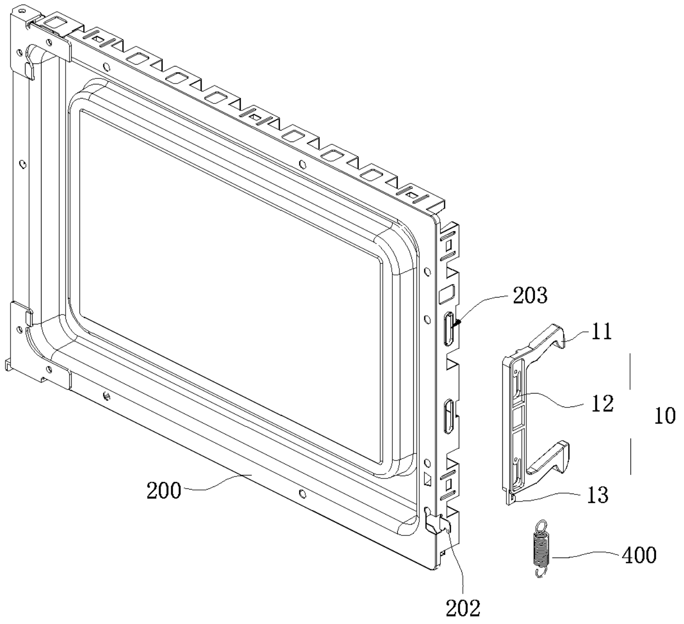
FIG. 16 is a three-dimensional structural schematic diagram of a door body according to some embodiments of the present disclosure.

Referring to FIG. 16 and FIG. 17, in some embodiments, the door body 200 includes a waist-shaped hole 201 and a first hook 202, and the snapping member 10 includes a moving portion 12 and a second hook 13. The first hook 202 and the second hook 13 are connected by a restore member 400. The moving portion 12 moves in the waist-shaped hole 201 and can move in the waist-shaped hole 201 along a Y1 direction or a Y2 direction. Referring to FIG. 15, in the process of closing the door, the hook 11 gradually moves into the bracket 20 along the inclined surface 211 of the limiting plate 21, and at the same time, the moving portion 12 is lifted along the Y1 direction in the waist-shaped hole 201, and the restore member 400 is stretched to generate a deformation to accumulate elasticity. When the hook 11 moves beyond the end of the inclined surface 211, the restore member 400 is restored from the stretched state and releases the elastic force, and the elastic force direction of the restore member 400 is parallel to a direction in which the hook 11 is snapped with the limiting plate 21, to drive the moving portion 12 and the hook 11 to drop along the Y2 direction. In this way, the hook 11 falls into the accommodating space 22. Referring to FIG. 17, in the process of opening the door, the hook 11 is lifted along the second direction L2, and at the same time, the moving portion 12 is lifted along the direction Y1 in the waist-shaped hole 201. After the hook 11 is lifted to leave the accommodating space 22, it can move along the X1 direction. The door body 200 is opened outward relative to the housing 300 while the hook 11 moves along the X1 direction. During the lifting of the hook 11 along the Y1 direction, the restoring member 400 needs to be driven to stretch, that is, it is necessary to overcome the elastic force of the restoring member 400 restoring the elastic deformation. The restoring member 400 with an appropriate stiffness coefficient can be selected. Thus, the adults can lift and pull out the hook 11 against the elastic force of the restoring member 400, while it is difficult for children to lift and pull the hook 11 against the elastic force of the restoring member 400. Therefore, it is avoided that the door body 200 is easily opened by the children's maloperation, and thus the potential safety hazards are reduced.

Figure 20:
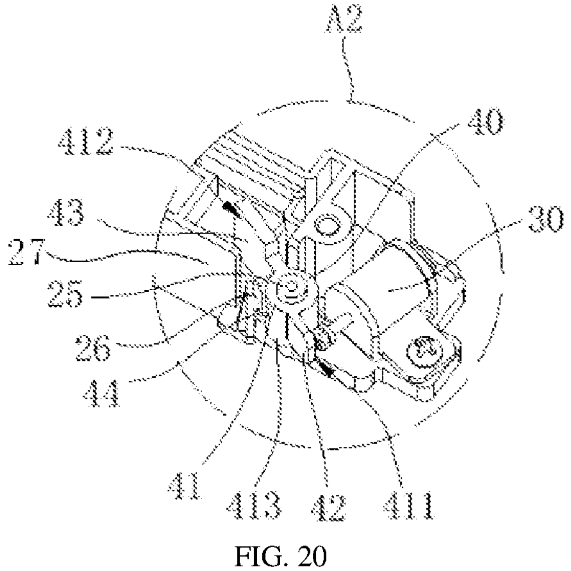
FIG. 20 is an enlarged schematic diagram of an A2 region of FIG. 15.

FIG. 20 is an enlarged view of an A2 region in FIG. 15. Referring to FIG. 15, FIG. 17 and FIG. 20, in some embodiments, the limiting member 40 includes a main body 41, an engagement portion 42 and a limiting portion 43. The main body 41 is rotatably mounted on the bracket 20. The engagement portion 42 extends from the first end 411 of the main body 41, and the engagement portion 42 is configured to engage with the driving assembly 30. The limiting portion 43 extends from the second end 412 of the main body 41, and the limiting portion 43 is configured to engage with the hook 11. In some embodiments, in the unlocked state, the limiting portion 43 is in contact with the wall surface 27 of the bracket 20 to avoid the hook 11.

Referring to FIG. 20, in some embodiments, the bracket 20 includes a mounting column 25 and a buckle 26, and the limiting member 40 further includes a blocking portion 44 disposed on the side wall 413 of the main body 41. The main body 41 is sleeved on the mounting column 25 in such a manner that the limiting member 40 can rotate relative to the mounting column 25. The blocking portion 44 is configured to abut against the buckle 26 to limit the movement of the main body 41 along the axial direction of the mounting column 25.

Referring to FIG. 17, in some embodiments, in the unlocked position, the limiting portion 43 is located outside a path along which the hook 11 is detached from the bracket 20. In the embodiment illustrated in FIG. 14, in the unlocked position, the driving assembly 30 and the limiting member 40 are not engaged, the limiting portion 43 hangs downwards naturally under the action of gravity. The limiting portion 43, when naturally hanging downwards, is located at a position outside the path along which the hook 11 is detached from the bracket 20, so as to avoid the hook 11. Referring to FIG. 20, under the driving of the driving assembly 30, the engagement portion 42 drives the main body 41 to rotate around the mounting column 25, so that the limiting portion 43 rotates to the locked position from the unlocked position. In the locked position, the limiting portion 43 is located on the path along which the hook 11 is detached from the bracket 20. Under the continued driving of the driving assembly 30, the limiting portion 43 is kept in the locked position.

Referring to FIG. 18, the weight of the limiting portion 43 is greater than the weight of the engagement portion 42. When the driving assembly 30 and the limiting member 40 are disengaged, the limiting portion 43 rotates to the unlocked position from the locked position under the action of its own gravity to release the limitation exerted by the limiting member 40 on the hook 11.

Referring to FIG. 17 and FIG. 18, in some embodiments, the driving assembly 30 includes a driving member 31 and a transmission member 32, the transmission member 32 is configured to engage with the limiting member 40, and the driving member 31 is configured to drive the transmission member 32 to engage with or disengage from the limiting member 40.

Figure 21:
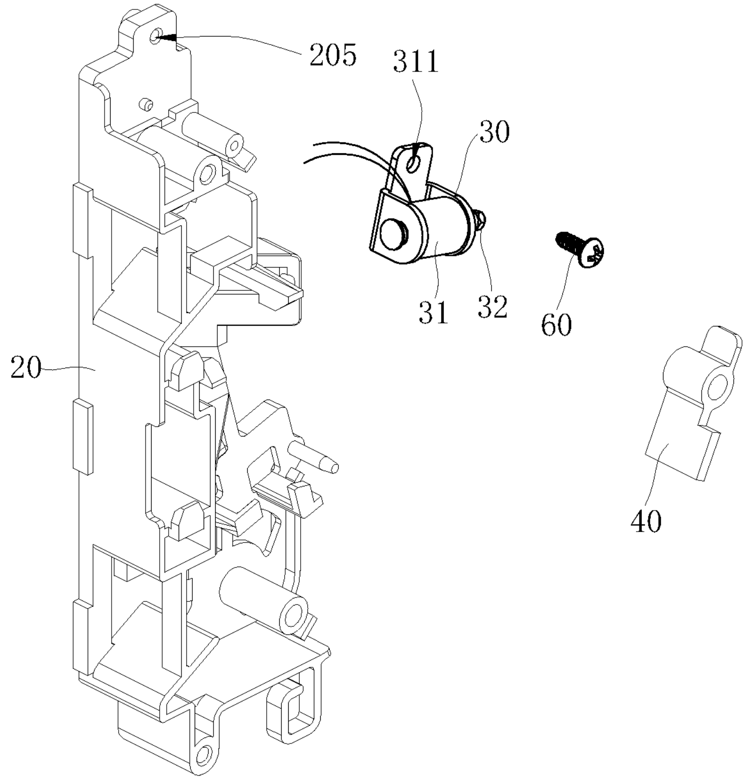
FIG. 21 is a three-dimensional structural schematic diagram of an interlock bracket, a limiting member and a driving assembly according to some embodiments of the present disclosure.

Referring to FIG. 21, in some embodiments, the bracket 20 includes a mounting hole 205, the driving member 31 includes a fixing hole 311, the latching structure 100 further includes a screw 60, and the screw 60 passes through the mounting hole 205 and the fixing hole 311 to fixedly mount the driving member 31 to the bracket 20.

Figure 22:
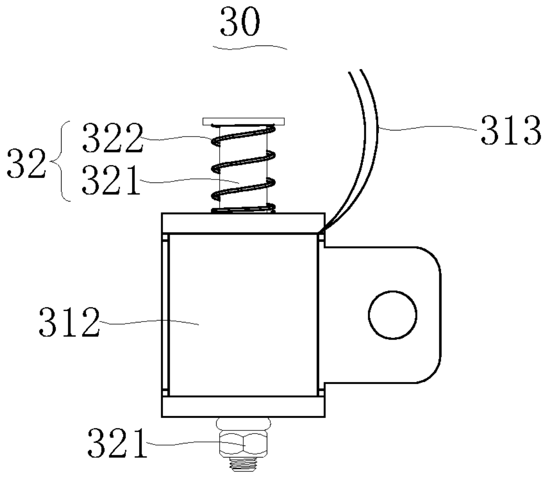
FIG. 22 is a structural schematic diagram of a driving assembly according to some embodiments of the present disclosure.

Referring to FIG. 22, in some embodiments, the driving member 31 includes an electromagnet 312, and the transmission member 32 includes a push rod 321 and an elastic portion 322. The push rod 321 is disposed to penetrate the electromagnet 312. The elastic portion 322 is sleeved on the push rod 321, and two ends of the elastic portion 322 are connected with the electromagnet 312 and the tail of the push rod 321, respectively.

Referring to FIG. 17, when the electromagnet 312 is energized, the electromagnet 312 drives the push rod 321 to move along the first direction L1. During the movement of the push rod 321 along the first direction L1, the elastic portion 322 is elastically deformed under compression. As the push rod 321 moves along the first direction L1, the push rod 321 pushes the limiting member 40 to rotate. In an embodiment, when the push rod 321 moves along the first direction L1 to reach the maximum stroke position, the limiting member 40 is in the locked position, and when the electromagnet 312 is continuously energized, the limiting member 40 will be kept in the locked position to prevent the hook 11 from disengaging from the bracket 20. In another embodiment, when the limiting member 40 is pushed by the push rod 321 to rotate to the maximum rotational stroke position, for example, when the limiting member 40 reaches the maximum stroke position where the limiting portion 43 rotates clockwise as the embodiment illustrated in FIG. 17, the limiting member 40 is in the locked position, and when the electromagnet 312 is continuously energized, the limiting member 40 will be kept in the locked position to prevent the hook 11 from disengaging from the bracket 20.

Referring to FIG. 16, when the electromagnet 312 is deenergized, the electromagnet 312 stops driving the push rod 321 to move along the first direction L1, the compressed elastic member is recovered from the elastic deformation to generate a restoring force, and the push rod 321 is driven by the restoring force to move along the second direction L2 to retract the push rod 321. The retracted push rod 321 removes the pushing force applied to the limiting member 40, and the limiting member 40 rotates under the action of gravity and returns to the unlocked position from the locked position, thus the limiting member 40 is maintained in the unlocked position under the action of gravity.

Referring to FIG. 22, in some embodiments, the latching structure 100 further includes a controller (not shown), and the driving member 31 further includes a lead wire 313, and the lead wire 313 is configured to connect to the controller. The controller controls the energizing or deenergizing of the electromagnet 312 through the lead wire 313 to switch the unlocked position and the locked position of the limiting member 40.

Referring to FIG. 19, when the door body 200 is opened, the hook 11 has not yet entered the bracket 20, and the electromagnet 312 is continuously energized to keep the limiting member 40 in the locked position. Referring to FIG. 17, when the hook 11 moves into the bracket 20 along the inclined surface 211 of the limiting plate 21, the limiting portion 43 of the limiting member 40 is located on the path blocking the hook 11 from entering the accommodating space 22, and thus the snapping member 10 needs to overcome the resistance of the limiting member 40 to allow the hook 11 to enter the accommodating space 22. In this way, by adjusting the magnetic force of the electromagnet 312, the driving force exerted by the driving assembly 30 on the limiting member 40 can be adjusted to adjust the resistance of the limiting member 40 on the hook 11. Thus, the resistance of the limiting member 40 on the hook 11 can be controlled within a suitable range, which enables the adults to push the hook 11 into the accommodating space 22 to close the door body 200 against the resistance of the limiting member 40 to the hook 11, and which is difficult for children to close the door body 200. Therefore, the children are protected from being pinched when closing the door. Referring to FIG. 17, after the hook 11 enters the accommodating space 22 by overcoming the resistance of the limiting member 40 and is locked with the limiting plate 21, the electromagnet 312 is still continuously energized, and thus the limiting member 40 is continuously kept in the locked position to prevent the hook 11 from disengaging from bracket 20. Referring to FIG. 18, when the door needs to be opened, the controller controls the electromagnet 312 to be deenergized, and the push rod 321 does not push the limiting member 40, so that the limiting member 40 returns to the unlocked position under the action of gravity. Thus, the hook 11 can be disengaged from the bracket 20. After the hook 11 is disengaged from the bracket 20, the door body 200 is opened, the controller controls the electromagnet 312 to be energized again, and thus the limiting member 40 is in the locked position.

Figure 23:
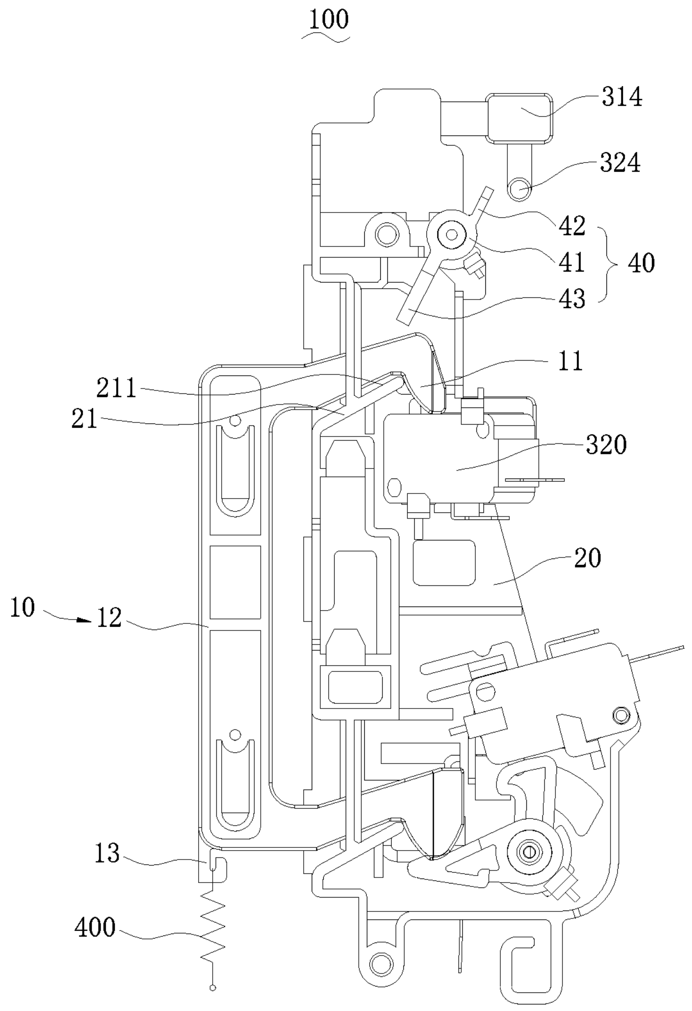
FIG. 23 is a structural schematic diagram of a latching structure according to some embodiments of the present disclosure.
Figure 24:
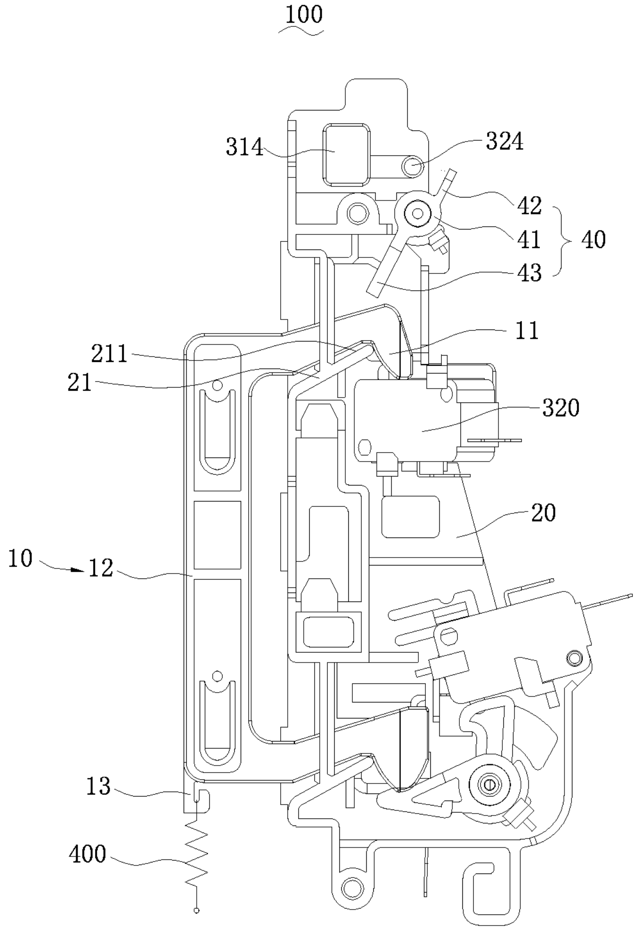
FIG. 24 is a structural schematic diagram of a latching structure according to some embodiments of the present disclosure.

Referring to FIG. 23 and FIG. 24, in some embodiments, the driving member 31 includes a driving circuit 314, and the transmission member 32 includes an electromagnet 324. The driving circuit 314 is configured to switch the energizing and deenergizing states of the electromagnet 324.

In some embodiments, the limiting member 40 is a magnetic metal or alloy member that can magnetically engage with the electromagnet 324.

In some embodiments, the limiting member 40 has a magnetic unit provided thereon, and when the electromagnet 324 generates a magnetic force, the magnetic unit is driven to drive the limiting member 40 to rotate. For example, the magnetic unit is a permanent magnet, and the magnetic unit is fixedly connected to the engagement portion 42 of the limiting member 40. When the electromagnet 324 is energized to generate a magnetic force, the magnetic force of the electromagnet 324 drives the permanent magnet to drive the engagement portion 42 to rotate.

Referring to FIG. 23, in an embodiment, the electromagnet 324 is disposed on the right side of the limiting member 40. When the electromagnet 324 is energized by the driving circuit 314, the electromagnet 324 generates a magnetic force, and the magnetism of the electromagnet 324 is opposite to the magnetism of the engagement portion 42, so that a mutually attractive magnetic force is generated to attract the engagement portion 42 close to the electromagnet 324 to drive the limiting member 40 to rotate clockwise to the locked position. When the limiting member 40 is in the locked position, the limiting portion 43 can prevent the hook 11 from disengaging from the bracket 20. When the electromagnet 324 is continuously energized, the magnetic force of the electromagnet 324 keeps the limiting member 40 in the locked position.

When the electromagnet 324 is not energized by the driving circuit 314, in absence of the magnetic force of the electromagnet 324, the magnetic engagement between the electromagnet 324 and the engagement portion 4 is removed, and the limiting member 40 moves to the unlocked position from the locked position under its own gravity.

Referring to FIG. 24, in another embodiment, the electromagnet 324 is disposed on the left side of the limiting member 40. When the electromagnet 324 is energized by the driving circuit 314, the electromagnet 324 generates a magnetic force, and the magnetism of the electromagnet 324 is the same as the magnetism of the engagement portion 42 to generate a mutually repulsive magnetic force, by which the engagement portion 42 is pushed away from the electromagnet 324, such that the limiting member 40 is driven to rotate clockwise to the locked position. When the limiting member 40 is in the locked position, the limiting portion 43 can block the hook 11 from disengaging from the bracket 20. When the electromagnet 324 is continuously energized, the magnetic force of the electromagnet 324 keeps the limiting member 40 in the locked position.

When the electromagnet 324 is not energized by the driving circuit 314, in absence of the magnetic force of the electromagnet 324, the magnetic engagement between the electromagnet 324 and the engagement portion 42 is removed, and the limiting member 40 rotates back to the unlocked position under the action of gravity.

In other embodiments, in the case of that the limiting member 40 rotates counterclockwise from the unlocked position to the locked position, if the electromagnet 324 is disposed on the left side of the limiting member 40, the magnetism of the electromagnet 324 is opposite to the magnetism of the engagement portion 42, and thus the magnetic force generated by the electromagnet 324 can attract the engagement portion 42 to approach the electromagnet 324, so that the limiting member 40 rotates counterclockwise to the locked position; and if the electromagnet 324 is disposed on the right side of the limiting member 40, the magnetism of the electromagnet 324 is the same as the magnetism of the engagement portion 42 of the limiting member 40, and thus the magnetic force generated by the electromagnet 324 can push the engagement portion 42 away from the electromagnet 324, so that the limiting member 40 rotates counterclockwise to the locked position.

Referring to FIG. 1, FIG. 2, and FIG. 14 to FIG. 16, the embodiments of the present disclosure further provide a household appliance 1000. The household appliance 1000 includes a door body 200, a housing 300, and the latching structure 100 as described in any one of the above embodiments. The door body 200 is connected to the housing 300 in an openable and closable manner. The bracket 20 and the driving assembly 30 are mounted on the housing 300. The snapping member 10 is mounted on the door body 200. The latching structure 100 can be applied to the household appliance 1000 to fasten the door body 200 of the household appliance 1000 on the housing 300.

The household appliance 1000 may include, but not limited to, a microwave oven, a steam oven, an electric oven, a refrigerator, etc., which are not specifically limited herein. The door body 200 can be mounted on the housing 300 by means of hinge connection.

Referring to FIG. 17 and FIG. 18, the latching structure 100 is configured to close the door body 200 on the housing 300 by snapping the hook 11 on the limiting plate 21 for locking. When the hook 11 is snapped on the limiting plate 21, the limiting member 40 is kept in the locked position under the driving of the driving assembly 30 to prevent the hook 11 from being detached from the bracket 20, and to avoid that the users, especially children who are not accompanied by adults, easily open the door body 200 by maloperation. When the user needs to open the door body 200, the driving assembly 30 stops driving the limiting member 40, and the limiting member 40 is switched to the unlocked position from the locked position, so as to remove the limitation on the movement of the hook 11. After the limiting member 40 removes the limitation on the movement of the hook 11, the door body 200 can be pulled to disengage the hook 11 from the limiting plate 21, and the hook 11 moves from the inside of the bracket 20 to the outside of the bracket 20, so that the door body 200 is opened from the housing 300. For the household appliance 1000 according to the embodiments of the present disclosure, the driving assembly 30 needs to be operated before the door body 200 is opened, which adds the steps of the door opening action of the household appliance 1000. Thus, the easy maloperation of the door opening action can be effectively prevented, and thus the use safety of the household appliance 1000 can be improved.

Referring to FIG. 1 to FIG. 3, in some embodiments, the household appliance 1000 further includes a control box 310 and a switch key 311. The control box 310 is disposed on the door body 200 or the housing 300 and is electrically connected to the driving assembly 30. The switch key 311 is arranged on the control box 310. The switch key 311 is configured to trigger an unlocking instruction, and the control box 310 controls the driving assembly 30 to be energized based on the unlocking instruction; and/or the switch key 311 is configured to trigger a locking instruction, and the control box 310 controls the driving assembly 30 to be deenergized based on the locking instruction.

Referring to FIG. 7 and FIG. 8, when opening the door, the switch key 311 is triggered to trigger the unlocking instruction, and the control box 310 controls the driving assembly 30 to be energized based on the unlocking instruction, so that the transmission member 32 pushes the engagement portion 42 to rotate, and the engagement portion 42 drives the limiting portion 43 to rotate from the locked position to the unlocked position to release the limitation on the hook 11 exerted by the limitation portion 43. The household appliance 1000 can set a time period for the electrical connection between the control box 310 and the driving assembly 31. Once the control box 310 and the driving assembly 31 are electrically connected for a predetermined time period, the electrical connection between the control box 310 and the driving assembly 31 is removed.

Referring to FIG. 9 to FIG. 11, when the door is closed, the switch key 311 is triggered to trigger the locking instruction, the control box 310 controls the driving assembly 30 to deenergized based on the locking instruction, and the transmission member 71 moves along the second direction to release the engagement with the engagement portion 42. The limiting portion 43 rotates to the locked position from the unlocked position under its own gravity, so that the limiting portion 43 limits the hook 11 in the accommodating space 22 of the limiting portion 21 to implement the child lock function.

In some embodiments, the household appliance 1000 further includes a sensitive switch (not shown) and a microwave generator (not shown). The sensitive switch is arranged on the bracket 20 and is electrically connected to the control box 310. The microwave generator is arranged on the housing 300 and is electrically connected to the control box 310. The control box 310 controls the microwave generator to stop working when the sensitive switch detects that the hook 11 is disengaged from the limiting portion 21.

During the use of the household appliance 1000, the control box 310 and the sensitive switch are continuously energized to detect in real time whether the hook 11 is disengaged from the limiting portion 21. When the sensitive switch detects that the hook 11 is disengaged from the limiting portion 21, a control signal can be transmitted to the control box 310, and the control box 310 controls the microwave generator to stop working based on the control signal, so as to avoid leakage of microwaves inside the housing 300 when the door body 200 is separated from the housing 300.

Figure 13:
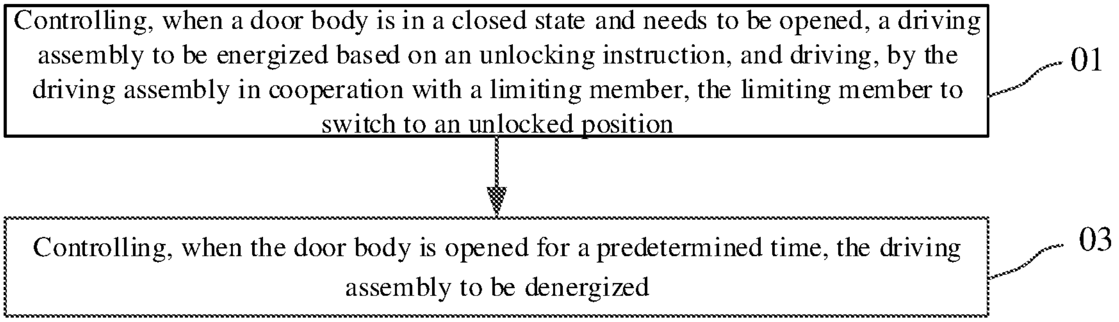
FIG. 13 is a flowchart of a control method of a household appliance according to some embodiments of the present disclosure.

Referring to FIG. 13, the embodiments of the present disclosure further provide a control method for a household appliance 1000, and the control method includes:

01: when the door body 200 is in the closed state and the door body 200 needs to be opened, the driving assembly 30 is controlled to be energized based on the unlocking instruction, and the driving assembly 30 is engaged with the limiting member 40 to drive the limiting member 40 to switch to the unlocked position; and 03: after a predetermined time period since the door body 200 is opened, the driving assembly 30 is controlled to be deenergized.

The door opening process of the household appliance 1000 is described as follows.

Referring to FIG. 7 and FIG. 8, by pressing the switch key 311 on the door body 200, the switch key 311 transmits an unlocking instruction to the control box 43; once the control box 310 receives the unlocking instruction, the electromagnet 312 is continuously energized by the control box 310 for 10 seconds to generate an attraction force, so that the push rod 321 moves along the first direction and is pushed out from the inside of the electromagnet 312, allowing the elastic portion 322 to be fixed between the push rod 321 and the electromagnet 312 in a compressed state. The protruding push rod 321 pushes the engagement portion 42 to rotate counterclockwise, and the engagement portion 42 drives the limiting portion 43 to rotate counterclockwise from the locked position to the unlocked position. The limitation portion 43 removes the limitation on the hook 11, and the door body 200 can be freely opened by applying an external force on the door body 200. When the energizing of the electromagnet 312 for 10 seconds is finished, in absence of the attraction force of the electromagnet 312, the elastic portion 322 is recovered from the compressed state and drives the push rod 321 to move along the second direction, and the limiting member 53 rotates from the unlocked position to the locked position under the action of gravity.

The closing process of the household appliance 1000 is as follows.

Referring to FIG. 9 to FIG. 12, a pushing force is applied to the door body 200, the door body 200 moves toward the bracket 20, and when the hook 11 moves along the limiting portion 21 and goes beyond the end portion of the limiting portion 21, the hook 11 abuts against the limiting portion 43 in the locked position and the hook 11 is pushed to drop into the accommodating space 22, while the hook 11 pushes the limiting portion 43 to rotate counterclockwise until the hook 11 moves into the accommodating space 22, and the support of the hook 11 on the limiting portion 43 is removed. The limiting portion 43 rotates clockwise to the locked position from the unlocked position under its own gravity, and the hook 11 is limited in the accommodating space 22 to ensure that the door body 200 cannot be directly opened by pulling and to ensure the door opening safety of the household appliance 1000.

In the latching structure 100, the household appliance 1000, and the control method for the household appliance 1000 according to the present disclosure, when the driving assembly 30 is engaged with the limiting member 40, the limiting member 40 is driven by the driving assembly 30 to be switched to the unlocked position. When the limiting member 40 is in the unlocked position and avoids the hook 11, the hook 11 can move to a position at which the hook 11 is disengaged from the limiting portion 21, the limiting member 40 removes the limitation on the hook 11 to implement the unlocking of the hook 11. In the unlocked position, the limiting member 40 can avoid the hook 11, and the hook 11 can move to a position at which the hook 11 is engaged with the limiting member 21 to implement the locking of the hook 11, so that the door body 200 is closed on the housing 300. When the driving assembly 30 is disengaged from the limiting member 40, the limiting member 40 is switched to the locked position under its own gravity, and thus the limiting member 40 can fit with the hook 11 to limit the position of the hook 11. Therefore, the difficulty of the hook 11 disengaging from the limiting portion 21 can be increased to implement the child lock function. In addition, it is easy to lock the hook 11 on the limiting portion 21 by the limiting member 40, and the limiting member 40 can be switched to the locked position under the action of its own gravity.

Figure 14:
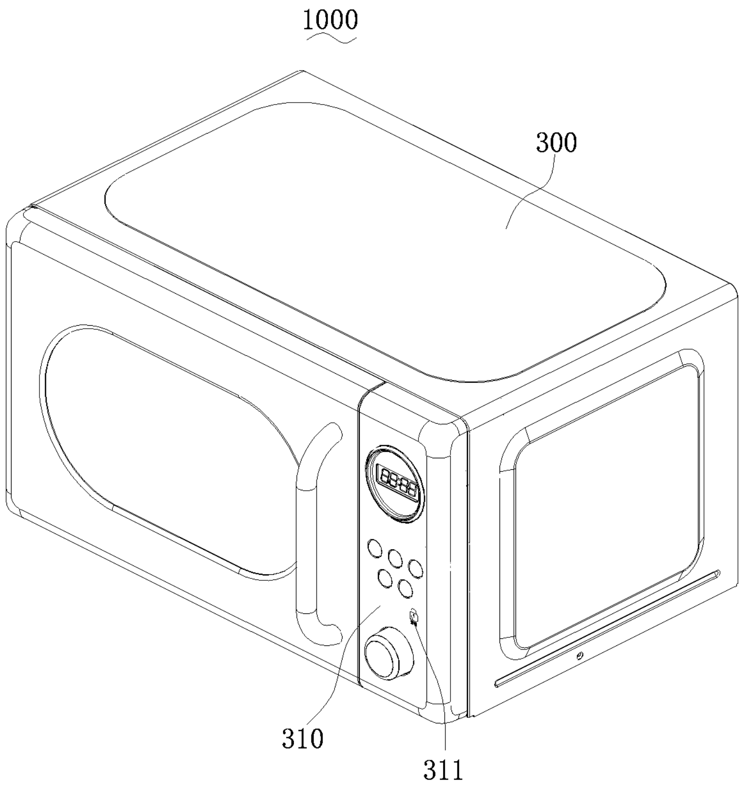
FIG. 14 is a three-dimensional structural schematic diagram of a household appliance according to some embodiments of the present disclosure.

Referring to FIG. 14, in some embodiments, the household appliance 1000 further includes a control box 310 and a switch key 311. In the embodiment illustrated in FIG. 14, the control box 310 is disposed on the housing 300. In other embodiments, the control box 310 may be disposed on the door body 200, which is not limited herein. The switch key 311 is arranged on the control box 310.

Referring to FIG. 17 and FIG. 18, in an embodiment, the switch key 311 is configured to trigger an unlocking instruction, and the control box 310 can control the driving assembly 30 to be deenergized based on the unlocking instruction, so that the limiting member 40 is in an unlocked state. For example, by triggering, by the switch key 311, the unlocking instruction to control the driving assembly 30 to be deenergized, the limiting member 40 changes from the locked state illustrated in FIG. 17 to the unlocked state illustrated in FIG. 18 to open the door body 200.

Referring to FIG. 17 and FIG. 18, in an embodiment, the switch key 311 is configured to trigger a locking instruction, and the control box 310 can control the driving assembly 30 to be energized based on the locking instruction, so that the limiting member 40 is in a locked state. For example, by triggering, by the switch key 311, the locking instruction to control the driving assembly 30 to be energized, the limiting member 40 changes from the unlocked state illustrated in FIG. 18 to the locked state illustrated in FIG. 17 to close the door body 200.

Figure 25:
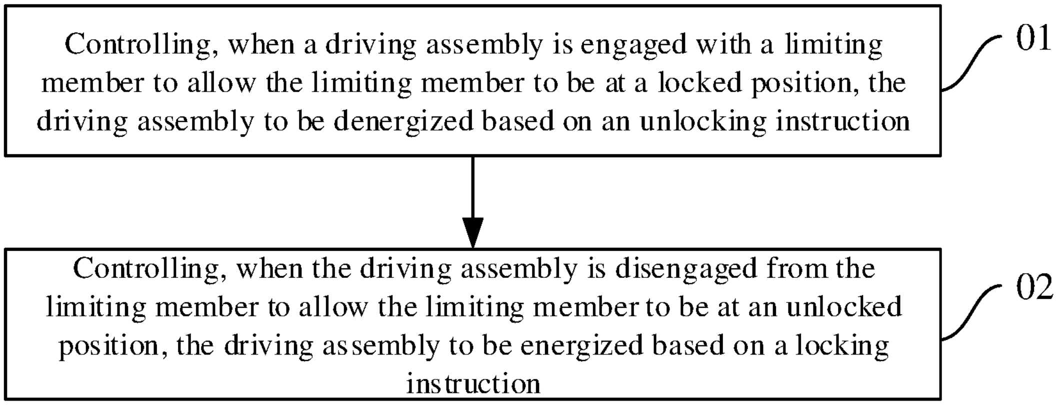
FIG. 25 is a schematic flowchart of a control method of a household appliance according to some embodiments of the present disclosure.

Referring to FIG. 25, the embodiments of the present disclosure further provide a control method for a household appliance 1000. The control method include:

01: controlling, when the driving assembly is engaged with the limiting member to allow the limiting member to be in the locked position, the driving assembly to be deenergized based on the unlocking instruction; and/or 02: controlling, when the driving assembly is disengaged from the limiting member to allow the limiting member to be in the unlocked position, the driving assembly to be energized based on the locking instruction.

The control method can be executed by a controller (not shown) of the latching structure 100, that is, the controller is configured to execute step 01 and/or step 02 of the method. Referring to FIG. 14, in an embodiment, the controller is disposed in the control box 310.

Referring to FIG. 14, in an embodiment, the user presses the switch key 311 to trigger the unlocking instruction. The control box 310 may also include other keys, and the user can toggle the other keys to trigger the locking instruction. In another embodiment, the user presses the switch key 311 to trigger the locking instruction. The control box 310 may also include other keys, and the user can press the other keys to trigger the unlocking instruction.

Referring to FIG. 14, in another embodiment, the user presses the switch key 311 to trigger the unlocking instruction, and the locking instruction is automatically triggered by the household appliance 1000 based on a predetermined time period.

In some embodiments, after the first predetermined time period since receiving the unlocking instruction, the controller controls the driving assembly 30 again to drive the limiting member 40 to move from the unlocked position to the locked position. The first predetermined time period may be 10 seconds, 12 seconds, 14 seconds, 16 seconds, etc., which is not limited herein.

For example, the push rod 32 elongates to drive the driving member 40 to move, the elongating push rod 32 contacts with and fits with the limiting member 40 to push the limiting member 40 to move, and when the limiting member 40 moves to the limiting position, the elongating push rod 32 abuts against the limiting member 40. When the door body 200 is in the closed state, the controller controls the push rod 32 to maintain the elongating state, and thus the push rod 32 can continuously abut against the limiting member 40, so that the limiting member 40 is in the locked position. When the door body 200 needs to be opened, the user presses the switch key 311 to trigger the unlocking instruction, and the controller controls the push rod 32 to retract. When the push rod 32 retracts to a certain position, the push rod 32 is not in contact with the limiting member 40. At this time, the push rod 32 is disengaged from the limiting member 40, and the limiting member 40 rotates from the locked position to the unlocked position under the action of its own gravity when there is no pulling force of the push rod 32 to open the path for the hook 11 to disengage from the bracket 20. Assuming that the first predetermined time is 10 seconds, after the switch key 311 is pressed to trigger the unlocking instruction and 10 seconds elapses, the controller controls the push rod 32 to extend again to push the limiting member to rotate from the unlocked position to the locked position.

Referring to FIG. 19, when the door body 200 is kept in the open state for the first predetermined time period and the snapping member 10 is away from the bracket 20, the user has to overcome the pulling force of the push rod 32 to push the hook 11 into the accommodating space 22 to close the door body 200. In this way, it is avoided that the door body is closed by mistake. Since the controller controls the push rod 32 to continue to elongate, the push rod 32 continues to abut against the limiting member 40 after the hook 11 moves into the accommodating space 22, so that the limiting member 40 is in the locked position to limit the movement range of the hook 11. When the door body 200 is in the closed state for the first predetermined time period, the household appliance 1000 will automatically control the limiting member 40 to move back to the locked position after the first predetermined time period. Thus, the door body can be locked in time when the user does not want to open the door.

Referring to FIG. 23, in some embodiments, the household appliance 1000 further includes a sensitive switch 320 disposed on the bracket 20. The sensitive switch 320 is configured to detect whether the hook 11 is engaged with the limiting plate 21. For example, when the hook 11 is engaged with the limiting plate 21, the hook 11 abuts against the sensitive switch 320. When the sensitive switch 320 cannot detect that it abuts against the hook 11, the sensitive switch 320 confirms that the hook 11 is not engaged with the limiting plate 21.

Referring to FIG. 14 and FIG. 23, in some embodiments, the microwave generator 330 and the sensitive switch 320 are both electrically connected to the control box 310. After the second predetermined time period since the control box 310 receives the unlocking instruction, if the sensitive switch 320 detects that the hook 11 is engaged with the limiting plate 21, the control box 310 controls the driving assembly 30 to be energized. In this way, it can be avoided that the driving assembly 30 is energized when the hook 11 moves into the bracket 20 but is not engaged with the limiting plate 21, resulting in that the limiting member 40 limits the movement of the hook 11 but the door 200 cannot be closed tightly. Therefore, it is ensured that the limiting member 40 limits the movement of the hook 11 when the door body 200 is tightly closed.

Referring to FIG. 15, in some embodiments, the household appliance 1000 further includes a microwave generator 330, and the microwave generator 330 is disposed in the housing 300 for generating microwaves. Referring to FIG. 14, in some embodiments, when the microwave generator 330 is in a working state, the control box 310 will not control the driving assembly 30 to be energized even if the switch key 311 triggers the unlocking instruction. In this way, the driving assembly 30 cannot drive the limiting member 40 to avoid the hook 11, and thus it is avoided that the door body 200 is in an openable state to cause a leakage of microwaves.

In the specification, descriptions with reference to the terms "an embodiment", "some embodiments", "illustrative embodiments", "an example", "a specific example", "some examples", etc., mean that specific features, structure, materials or characteristics described in conjunction with the embodiment or example are included in at least an embodiment or example of the present disclosure. In this specification, the schematic representations of the above terms do not necessarily refer to the same embodiment or example. Moreover, the described specific features, structures, materials or characteristics may be combined in any one or more embodiments or examples in a suitable manner.

Although embodiments of the present disclosure have been illustrated and described above, it is conceivable for those skilled in the art that various changes, modifications, replacements, and variations can be made to these embodiments without departing from the principles and spirit of the present disclosure. The scope of the present disclosure shall be defined by the claims as attached and their equivalents.

What is claimed is:

1. A latching structure comprising:
- a snapping member mounted on a door body and comprising a hook;
- a bracket mounted on a housing, wherein the bracket comprises a limiting portion configured to engage with the hook, the hook being capable of penetrating the bracket, and the door body being connected to the housing in an openable and closable manner;
- a limiting member rotatably mounted to the bracket and capable of reciprocating between an unlocked position and a locked position; and
- a driving assembly configured to engage with or disengage from the limiting member, wherein the limiting member is driven to be switched to the unlocked position when the driving assembly is engaged with the limiting member, and wherein the limiting member is switched to the locked position under its own gravity when the driving assembly is disengaged from the limiting member,
- wherein in the unlocked position, the limiting member is configured to avoid the hook in such a manner that the hook is capable of moving to separate from or engage with the limiting portion, and
- wherein in the locked position, the limiting member is configured to fit with the hook to limit a position of the hook.

2. The latching structure according to claim 1, wherein when the hook is separated from the limiting portion and the limiting member is in the locked position under its own gravity, the hook is capable of pushing the limiting member to rotate to the unlocked position.

3. The latching structure according to claim 2, wherein the limiting member comprises:
- a main body rotatably mounted on the bracket;
- an engagement portion mounted on a side surface of the main body and configured to engage with the driving assembly; and
- a limiting portion mounted on a side surface of the main body and configured to limit the hook on the limiting portion,
- wherein the hook is capable of pushing the limiting portion to move to the unlocked position,
- wherein a weight of the limiting portion is greater than a weight of the engagement portion, and
- wherein, when the driving assembly is disengaged from the engagement portion, the limiting portion is capable of moving from the unlocked position to the locked position under its own gravity.

4. The latching structure according to claim 3, wherein the bracket further comprises a mounting column and a buckle, and wherein the limiting member further comprises a blocking portion disposed on a side surface of the main body, the main body being sleeved on the mounting column in such a manner that the limiting member is capable of rotating relative to the mounting column, and the blocking portion being configured to abut against the buckle to limit a movement of the main body along an axial direction of the mounting column.

5. The latching structure according to claim 3, wherein an end of the limiting portion comprises an arc surface, and wherein in the locked position, the arc surface is in contact with and fits with the hook to limit a position of the hook.

6. The latching structure according to claim 1, wherein the driving assembly comprises:

a driving member mounted on the bracket; and a transmission member connected to the driving member, wherein the transmission member is configured to engage with the limiting member, and wherein the driving member is configured to drive the transmission member to engage with or disengage from the limiting member.

7. The latching structure according to claim 6, wherein the driving member further comprises an electromagnet, and wherein the transmission member comprises:

a push rod disposed to penetrate the electromagnet; and an elastic portion sleeved on the push rod, two ends of the elastic portion respectively abutting against the electromagnet and a tail of the push rod, wherein when the electromagnet is energized, the push rod is driven by the electromagnet to move in a first direction to push the limiting member to rotate to the unlocked position; and wherein when the electromagnet is deenergized, the push rod is driven by a restoring force generated by the elastic portion to move in a second direction in such a manner that the limiting member is capable of rotating to the locked position under its own gravity, the first direction being opposite to the second direction.

8. The latching structure according to claim 6, wherein the driving member further comprises a driving circuit, wherein the transmission member comprises an electromagnet, wherein, when the electromagnet is energized by the driving circuit, the limiting member is driven by a magnetic force generated by the electromagnet to rotate to the unlocked position; and wherein, when the electromagnet is not energized by the driving circuit, in absence of the magnetic force of the electromagnet, the limiting member is capable of moving back to the locked position from the unlocked position under its own gravity.

9. The latching structure according to claim 8, wherein the limiting member is a magnetic metal or alloy member; or wherein the limiting member has a magnetic unit provided thereon and configured to magnetically engage with the electromagnet.

10. A household appliance comprising:

a door body;

a housing connected to the door body in an openable and closable manner; and the latching structure according to claim 1, wherein the bracket and the driving assembly are mounted on the housing, and wherein a snapping member is mounted on the door body.

11. The household appliance according to claim 10, further comprising:

a control box disposed on the door body or the housing, and electrically connected to the driving assembly; and a switch key arranged on the control box, wherein the switch key is configured to trigger an unlock instruction, the driving assembly being controlled by the control box to be energized based on the unlock instruction; and/or wherein the switch key is configured to trigger a locking instruction, the driving assembly being controlled by the control box to be deenergized based on the locking instruction.

12. The household appliance according to claim 11, further comprising:

a sensitive switch arranged on the bracket and electrically connected to the control box; and a microwave generator arranged in the housing and electrically connected to the control box, wherein in response to detecting, by the sensitive switch, that the hook is disengaged from the limiting portion, the microwave generator is controlled by the control box to stop working.

13. A control method for the household appliance according to claim 10, the control method comprising:

controlling, when the door body is in a closed state and needs to be opened, the driving assembly to be energized based on an unlock instruction; and driving, by the driving assembly in cooperation with the limiting member, the limiting member to switch to the unlocked position.

14. The control method according to claim 13, further comprising:

controlling, after a predetermined time period since the door body is opened, the driving assembly to be deenergized.

* * * * *